June 22, 1965  A. ZAROUNI  3,190,965
RIGHT-OF-WAY SWITCHING CIRCUITRY
Filed March 28, 1961  7 Sheets-Sheet 1

INVENTOR
A. ZAROUNI
BY
ATTORNEY

June 22, 1965     A. ZAROUNI     3,190,965
RIGHT-OF-WAY SWITCHING CIRCUITRY
Filed March 28, 1961     7 Sheets-Sheet 6

INVENTOR
A. ZAROUNI
BY
*Sil Turner*
ATTORNEY

June 22, 1965  A. ZAROUNI  3,190,965
RIGHT-OF-WAY SWITCHING CIRCUITRY
Filed March 28, 1961  7 Sheets-Sheet 7
FIG. 12A
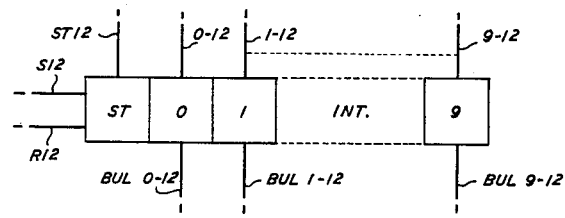
FIG. 12B
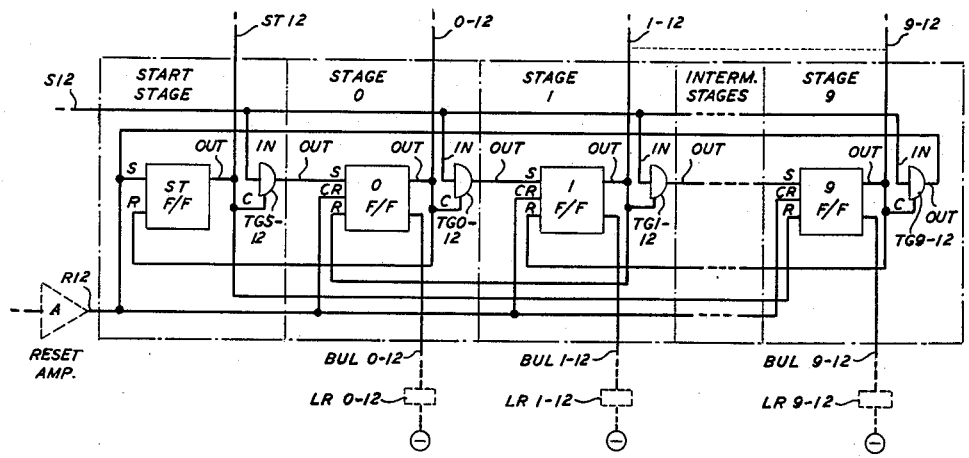
FIG. 13B
FIG. 13A
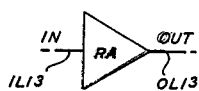
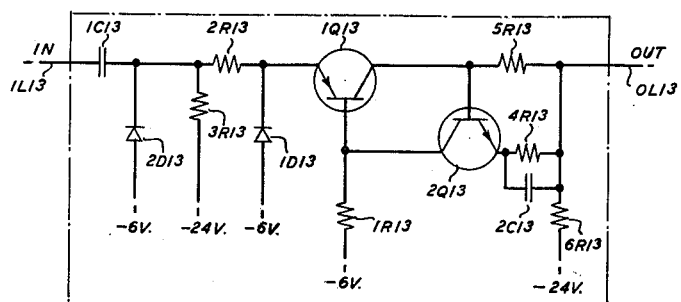
INVENTOR
A. ZAROUNI
BY
ATTORNEY

3,190,965
RIGHT-OF-WAY SWITCHING CIRCUITRY
Alfred Zarouni, Brooklyn, N.Y., assignor to Bell Telephone Laboratories, Incorporated, New York, N.Y., a corporation of New York
Filed Mar. 28, 1961, Ser. No. 99,014
33 Claims. (Cl. 179—18)

This invention relates generally to communications switching systems wherein a busy facility may be preempted or commandeered or seized or secured to serve more urgent traffic, and more particularly relates to such systems wherein the busy condition of an outgoing line serving non-right-of-way traffic may be disregarded and the existing connection "bumped-off" in favor of right-of-way traffic being served by a privileged incoming line.

More specifically, the present invention relates to systems of the foregoing type wherein is provided circuitry for ascertaining or detecting that an incoming message is urgent, for denoting or detecting that the incoming line is privileged, for determining from this joint information that the incoming message is entitled to be accorded "bump-off" service, for ascertaining the use status of a suitable outgoing facility and if busy discriminating whether it is serving a nonurgent message or an urgent message, for "bumping-off" a connection to an outgoing facility serving a nonurgent message, and for pre-empting, commandeering or seizing the "bumped-off" facility to serve the urgent message.

The particular embodiment of the invention, as hereinafter shown and described, relates to new and novel automatic switching circuitry for communications systems, and particularly to those systems which are provided with a plurality of optionally and progressively usable trunk groups affording alternative access paths to a required destination, and in which particular systems the priority of use of such trunks to complete a given connection is predicated on the "class-of-service" of the calling line and the priority index or code accompanying the incoming message.

The invention, as disclosed herein, provides means for the detection, reception, translation and utilization of code data manifestations for the purpose of ascertaining the degree of urgency of an incoming message, for ascertaining the class-of-service of an incoming line, and for controlling the hunting and securing of an idle trunk capable of serving, and suitable to serve, an urgent message. When, in a given trunk group, no such idle trunk is found for serving an urgent call, a particular trunk therein if serving a nonurgent message is rendered idle, and the "idled" trunk is pre-empted, commandeered, seized, secured or designated to serve the more urgent message.

In communications systems arranged for the automatic interconnection of a calling line or trunk and a called line or trunk, one or more switching centers may be employed. A switching center comprises a plurality of lines or trunks, terminating circuitry individual to each line or trunk, trunk hunting circuitry for ascertaining the busy or idle status of lines or trunks, and switching circuitry for effecting interconnection between a calling line or trunk and an idle called line or trunk. The trunks outgoing from one switching center to another switching center are resolved into groups, each such trunk group affording an alternative or optional route to the same switching center destination.

The particular embodiment of the invention, as hereinafter shown and described, further involves new and novel arrangements of apparatus and circuitry whereby each of the outgoing trunk groups is successively tested, regardless of the fact that all of the trunks therein may be busy, to ascertain the use status of the trunks in the group and to seek a trunk therein to serve an urgent incoming message. The invention also provides new and novel circuitry whereby, if in a given trunk group a particular trunk therein is busy with a nonurgent message, to render idle, pre-empt, commandeer, seize or secure the particular trunk to serve the urgent message. The invention further provides new and novel circuitry whereby, if in a given trunk group a particular trunk therein is busy with an urgent message, to advance the trunk hunting to a succeeding trunk group and to test among the trunks thereof to ascertain the use status thereof and to seek a trunk therein to serve the urgent message.

A broad object of the present invention is to provide a communication switching system wherein a busy facility may be commandeered, seized or pre-empted to serve urgent traffic provided that the line servicing such an urgent message and the message itself and the nature of the busy condition embody qualifications requisite to permit such drastic action.

Another broad object of the present invention is to provide a communication switching center whereby to pre-empt, commandeer, seize or secure the use of a busy outgoing facility in accordance with a set of characteristics indicative of the exigency of an incoming message, the privileged nature of an incoming facility, and the non-exigent use status of the outgoing facility.

Still another broad object of the present invention is to provide a communications switching center whereby to recognize a characteristic indicative of the exigency of a message received over an incoming facility thereof, to detect a service class characteristic of the incoming facility, to ascertain the use status of a suitable outgoing facility and, if the suitable outgoing facility is serving a nonexigent message, to jointly utilize the two aforesaid characteristics to effect the relinquishment of the siutable outgoing facility serving a non-exigent message, and to pre-empt, commandeer, seize or secure the relinquished outgoing facility to serve the exigent message.

Accordingly, a feature of the invention is means for ascertaining from an accompanying electrical characteristic of an incoming message if the message is a right-of-way message, means for detecting a concomitant electrical characteristic of a privileged incoming line whereby to ascertain whether or not that incoming line is entitled to have a right-of-way message incoming thereover accorded "bump-off" privileges, means for ascertaining whether or not a suitable outgoing facility is serving a right-of-way message, means jointly controlled by the message-accompanying electrical characteristic and by the concomitant electrical characteristic of a privileged incoming line to render idle or "bump-off" an existing connection to a suitable facility serving a non-right-of-way message, and means for seizing or pre-empting the "bumped-off" facility to serve the right-of-way message.

Another feature of the invention is the provision of means to control the application of a disconnect or "bump-off" signal to a particular suitable outgoing facility which is busy with a non-right-of-way message.

Still another feature of the invention is the provision of means effective for "remembering" the busy or idle condition of an outgoing communication facility and for giving an indication significant thereof or corresponding thereto, and means effective, if the facility is busy, for "remembering" whether the facility is busy with a right-of-way message or a non-right-of-way message and for giving an indication significant thereof or corresponding thereto.

Still another feature of the invention is the provision of means operative during a first scanning cycle of a trunk group for applying a signal to effect the relinquishment of a particular trunk so as to insure the availability of an idle trunk, means to rescan the same trunk group, and means effective during the rescanning cycle to seize said relinquished particular trunk, or any other trunk in said group that may have become idle in the interim, to serve an urgent message.

Still another feature of the invention is means operative during a first scanning cycle to scan a preferred trunk group to seek to effect the relinquishment of a particular trunk in said preferred trunk group if all trunks in the preferred group are busy, means operative incident to the urgent use of said particular trunk in said preferred group to reinitiate the trunk scanning cycle within a less-preferred trunk group, and means operative incident to an all-trunks-busy condition and to the nonurgent use of another particular trunk in said less-preferred trunk group to effect the connection of a disconnect or "bump-off" signal to said other particular trunk in said less-preferred trunk group, thereby to effect the relinquishment of said other particular trunk in said less-preferred trunk group.

The foregoing objects and featues of the invention, and others that will be apparent to one skilled in the art, may be readily understood by reference to the following detailed description of an exemplary embodiment thereof as delineated in the drawings wherein:

FIG. 1 diagrammatically illustrates the organization of the principal functional circuitry;

FIG. 2 shows the pattern for arranging FIGS. 3 through 6 to represent an exemplary disclosure of the invention;

FIGS. 3 through 6, in general, show circuitry of those portions of a right-of-way switching system such as embodied in the exemplary disclosure of the instant invention, and in sufficient detail to enable one skilled in the art to understand the manner in which the received address codes are registered, translated and utilized to find or procure an idle trunk affording access to a required destination and to designate said trunk for interconnection; and FIG. 6 also shows, in diagrammatical form, the rudiments of a switching network, and, more specifically;

FIGS. 3 and 4 diagrammatically show a plurality of line or trunk terminating circuits and means for designating certain of said lines or trunks for interconnection;

FIG. 5 shows circuitry for successive trunk hunting through a plurality of optional trunk groups;

FIG. 6 diagrammatically shows circuitry for registering, translating and utilizing said received address codes and other pertinent data, and circuitry for route-advancing, thereby to progressively designate optional trunk groups acording access to said destination via a first, second or subsequent choice trunk group; and FIGS. 7A through 13B show the several symbols employed in the detailed disclosure of FIGS. 3 through 6 and typical equivalent circuitry respectively corresponding to the symbols.

GENERAL DESCRIPTION OF SYSTEM

This description is related to FIG. 1 wherein is diagrammatically illustrated the organization of the principal functional circuitry in a right-of-way switching system whereby, at a switching center, an incoming "right-of-way" call or message will be permitted to "bump-off" or pre-empt the services of a busy line or trunk engaged in a connection with a non-right-of-way call or message. The means for performing the several functions are respectively represented by correspondingly designated rectangles, and the lines interconnecting said rectangles represent conductive paths therebetween; each such conductive path may comprise one or more conductors. An exemplary disclosure of the right-of-way switching circuitry at such a switching center is shown in considerable detail in FIGS. 3 through 6, a detailed description of which switching center circuitry is provided hereinafter.

A switching center according to the instant invention comprises a plurality of lines or trunks (e.g., LA), a plurality of line or trunk terminating circuits (e.g., CCT.A) respectively terminating the lines or trunks, a switching network SN for effecting interconnections between a calling and a called line or trunk via conductive paths (e.g., LAC), a priority register PR for registering the degree of priority to be accorded to a particular message, an addess code register ACR for registering the direction in which a particular message is to progress and the switching center of destination of the message, a calling class identifier or register CCR for ascertaining if a particular calling line or trunk is entitled to "bump-off" or pre-emptive service, line status circuitry LS for ascertaining whether or not the called line or trunk is busy and, if busy, whether or not the calling line or trunk is serving an ROW (right-of-way) message, "bump-off" logic circuitry BL controlled jointly by said line, status, priority, address code, and calling class registers for determining whether or not a call in being may be "bumped-off" or pre-empted for use by an incoming call or message, a source of "bump-off" signals BS controlled by the "bump-off" logic circuitry for generating a suitable signal recognizable by the associated line or trunk circuitry as a directive to disconnect, and line seizure circuitry LSZ controlled by the "bump-off" logic circuitry for designating for seizure a called line or trunk when the line or trunk shall have become idle.

Symbols and equivalent circuitry

This description is confined to FIGS. 7A through 13B in which are shown the several symbols employed throughout the detailed disclosure of FIGS. 3 to 6, inclusive, and the equivalent circuitry respectively corresponding to the symbols.

The transmission gate

FIGS. 7A and 7B illustrate symbols for transmission enabling gates with respect to which the equivalent circuitry is shown in FIG. 7C. With —24 volts (all potentials are assumed to be with respect to ground potential) on the control lead CL7, the transmission gate is nonconductive so as to inhibit a positive-going pulse on input lead IL7 of up to 18 volts amplitude; and, with the control lead CL7 at —8 volts the gate is in a conducting condition so as to permit a positive-going input pulse in excess of 2 volts, say 16 volts, for example, to be transmitted therethrough to the output lead OL7. The gate shown in FIG. 7B is a slow-acting gate employing the same circuit configuration as for FIG. 7A and wherein the slow-acting characteristic of the gate is obtained by suitably increasing the value of capacitor C7 to afford any desired increased values of delay.

The inhibiting gate

FIG. 8A shows the symbol for an inhibiting gate with respect to which the equivalent circuitry is shown in FIG. 8B. This gate is normally conductive for a positive-going input pulse in excess of 2 volts, say 16 volts, for example, on lead IL8 when the control lead CL8 has —24 volts applied thereto, but will inhibit the transmission of such a positive-going input pulse when the control lead CL8 has —8 volts applied thereto.

The "AND" gate

FIG. 9A shows the symbol for an AND gate with respect to which the equivalent circuitry is shown in FIG. 9B. The input leads IA9, IB9 through IN9 are adapted to have applied thereto, for example, either —24 volts or —8 volts. With —24 volts applied to all of the inputs the output lead OL9 will be at substantially —24 volts. If any less than all of the input leads have —8 volts input, the output lead OL9 will remain at —24 volts. It is only when all of the input leads are raised to —8 volts that the output lead OL9 changes its potential from —24 volts to —12 volts.

The "OR" gate

FIG. 10A shows the symbol for a typical OR gate with respect to which the equivalent circuitry is shown in FIG. 10B. With —24, for example, volts on each of the input leads the output lead OL10 will assume a potential of substantially —24 volts. Whereas, if any one or more of the input leads is adjusted to a potential of —8 volts, for example, the output lead OL10 will similarly assume —8 volts potential. It is, of course, to be understood that OR gates having a greater number of input leads than in the illustrated example will function in a manner similar to that above outlined.

The flip-flop

With reference to the symbols shown in FIGS. 11A, 11B, and 11C, and to the equivalent circuit therefor shown in FIG. 11D, flip-flops are shown wherein provisions are made for various input and output lead requirements; and wherein the setting of the switch or switches shown in FIG. 11D will adapt the flip-flop circuit to afford the connections specified in FIG. 11A, FIG. 11B, or FIG. 11C.

Circuit condition—Re: FIG. 11A

With respect to FIG. 11A, which shows a "SET" lead S11, a "reset" lead R11, and an "OUTPUT" lead OL11, the circuit shown in FIG. 11D may be adapted to provide an equivalent circuit arrangement therefor by setting the wiper of reset switch RS11 on its contact RC11, by setting the wiper of output switch OS11 on its contact OC16, and by setting the wiper of buffer output switch BUS11 on its non-buffer contact NBU11 to provide a potential of —6 volts for the collector of transistor 3Q11. Common reset switch CRS11 will be open.

Circuit condition—Re: FIG. 11B

With respect to FIG. 11B, which is similar to FIG. 11A, but which shows in addition a "buffer output" lead BUL11, the circuit in FIG. 11D may be adapted to provide an equivalent circuit for FIG. 11B by using the same switch settings as for FIG. 11A, except that the wiper of buffer output switch BUS11 will be set on its buffer contact BC11 to connect a potential of —24 volts, through the winding of load relay LR11 to transistor 3Q11.

Circuit condition—Re: FIG. 11C

With respect to FIG. 11C, which is similar to FIG. 11B but which shows in addition a "common reset" lead CR11, the circuit shown in FIG. 11D may be adapted to provide an equivalent circuit for FIG. 11C by using the same switch settings as for FIG. 11B, except that the wiper of common reset switch CRS11 will be set on its contact CRC11.

Circuit function—Re: FIG. 11A

Let it be assumed that the requirements of the circuit are such that a flip-flop of the type symbolized by FIG. 11A is to be employed. The flip-flop is essentially a bi-stable circuit which in its "off" condition (i.e., not set) causes a potential of —24 volts to appear on its output lead OL11, and which in its "on" condition (i.e., set) causes the potential on its output lead OL11 to change to —8 volts. A positive-going input signal, on input lead S11, in excess of about 6 volts will turn on the flip-flop. A positive-going "reset" signal having an amplitude in excess of 9 volts, if applied to the "reset" lead R11, will cause all of the transistors to become nonconducting, thus resetting the flip-flop back to its "normal" or "off" condition.

If the requirements of the circuit are such that a flip-flop of the type symbolized by FIG. 11B is to be employed, the circuit operation will be substantially the same as previously described with reference to FIG. 11A with the exception that the buffer output transistor 3Q11 is used to control a load device. Under this condition, the wiper of switch BUS11 will be set on its contact BC11, thereby providing an additional "buffer" output lead BUL11 terminated in —24 volts through the winding of a relay or other suitable load device or circuit.

Circuit function—Re: FIG. 11C

If a circuit of the type symbolized by FIG. 11C is to be employed, the flip-flop is of the same nature and operates in substantially the same manner as described with reference to FIG. 11B with the exception, however, that in a circuit per FIG. 11C, in addition to the regular reset lead R11, a second or "common reset" lead CR11 is used. Under this condition, the wiper of common reset switch CRS11 will be set on its contact CRC11. Under this condition, means is provided whereby when a plurality of flip-flops are used, a group comprising any desired number of such flip-flops may have their respective common reset leads connected together and in turn connected to a suitable source of resetting potential for simultaneously resetting the flip-flops of such group independently of their respective individual reset leads. A ground potential or positive pulse of suitable amplitude, if applied to the common reset lead CR11, will cause all of the transistors to become non-conductive, thus resetting the flip-flop back to its previously-described normal condition.

The ring counter

With reference to the symbol shown in FIG. 12A and to the symbolized circuitry shown in FIG. 12B, the interrelationship is shown of a plurality of flip-flops coupled together by means of transmission gates to constitute a ring counter. The flip-flops are of the type such as shown in FIGS. 11A and 11C previously described. The transmission gates are of the type shown in FIG. 7A previously described.

Having in mind the preceding descriptive matter relating to the flip-flop circuits and to the transmission gate circuits, the descriptive material immediately following will be confined to the operation of the ring counter with reference to FIGS. 12A and 12B.

It is assumed that the ring counter is in its starting position represented by the flip-flop ST (first or "START" stage of the ring counter) being in its "SET" or "on" condition and all of the remaining flip-flop stages 0 through 9 being in their reset or "off" conditions. Under this condition, the output lead ST12 will be at a potential of approximately —8 volts, while each of the output leads 0-12 through 9-12 will be at potentials of approximately —24 volts. The transmission gate TGS-12 will be in a primed or enabled condition and all of the remaining transmission gates TG0-12 through TG9-12 will be in an inhibiting condition. If at this moment a positive-going input pulse in excess of 8 volts but less than 24 volts is applied to the set lead S12, such a pulse will be transmitted through gate TGS-12 to cause flip-flop 0 to be turned on, thereby changing the potential on output lead 0-12 from —24 to —8 volts, which primes or enables gate TG0-12 and resets flip-flop ST.

In a like manner, a succession of such positive-going pulses on lead S12 will cause successive flip-flops in the ring counter chain to be turned on and preceding ones to be turned off. With stage 9 of the ring counter turned on and all of the preceding stages turned off, upon the reception of the next positive input pulse on lead S12, the flip-flop ST will be turned on, thereby resetting flip-flop 9 to, in effect, recycle the ring counter. Although stages 0 through 9 of the ring counter have buffer outputs for controlling relays, such as LR0-12 through LR9-12 indicated in dotted lines, none of these relays will operate unless the ring counter stops for a substantial length of time in the corresponding position. The pulses supplied to the input lead S12 occur with such rapidity that any particular ring counter stage does not remain in its "on" condition long enough to cause the operation of its relay.

If at any point in the operating cycle of the ring counter, a ground potential or positive pulse of suitable amplitude is applied to the common reset lead R12, the flip-flop ST will be set, or turned on, and the remaining flip-flops 0 through 9 will be reset, or turned off. Thus, the ring counter may be returned to its "normal" condition at any time by suitably energizing the common reset lead R12.

When the circuit requirements are such that less than all of the leads are needed, the unnecessary leads may be left unconnected and, therefore, in some instances, it is considered unnecessary to show them in the detailed circuit disclosure.

The regenerative amplifier

FIG. 13A shows the symbol for a regenerative amplifier with respect to which equivalent circuitry is shown in FIG. 13B. This amplifier is a monostable circuit which in its stable or nonexcited state causes a potential of approximately −24 volts to appear on its output lead OL13. If a positive-going input pulse of at least two volts amplitude and at least two microseconds duration is applied to input lead IL13, the amplifier is energized thereby to generate and produce at its output lead OL13 a positive-going output pulse of substantially rectangular wave form, and manifested by the output potential changing from −24 volts to −8 volts. The output pulse will have a duration determined by the resistance-capacity characteristics of the circuit, a typical duration being, for instance, in the order of a few milliseconds. This amplifier may be used when the amplitude of the available input pulse has become attenuated and hence the pulse must be amplified sufficiently to effect the operation of a succeeding circuit, or when it is for some other reason desirable to interconnect components to assure reliable operation thereof.

DETAILED DESCRIPTION OF SYSTEM

Figure 1:
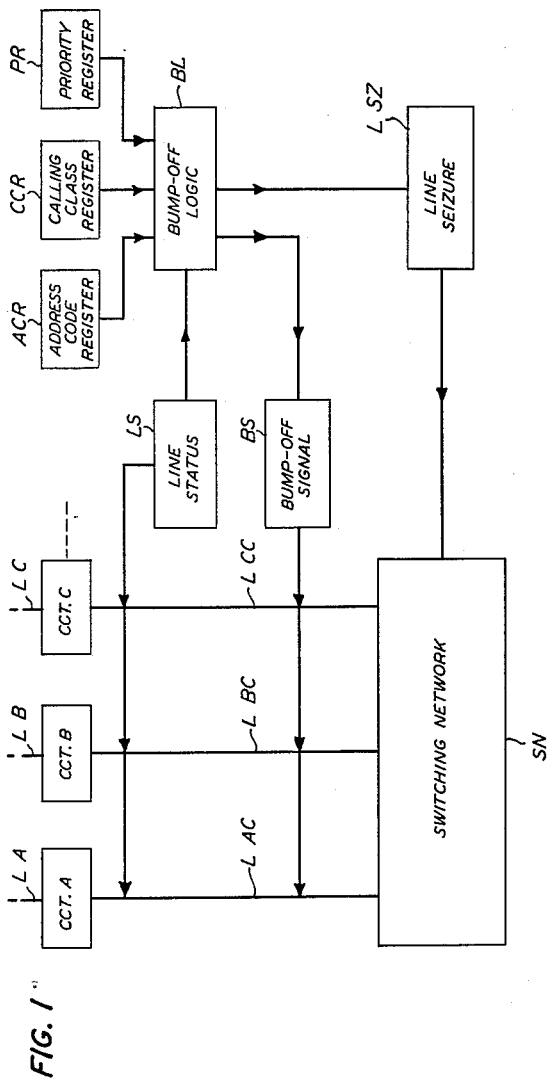
Figure 2:
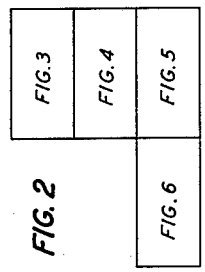

This portion of the description relates to the detailed operation of the exemplary right-of-way switching center circuitry shown in FIGS. 3 through 6; and which switching center circuitry is particularly adapted for use in a switching system comprising a plurality of such switching centers.

Codes

In the switching system of the embodiment of the instant invention, each message has associated therewith a multidigit address code, and the control of the circuitry is selectively effected in accordance with suitable prearranged combinations of electrical stimuli derived from said address codes and applied to said circuitry. Such codes may consist, for example, of binary code digits, which binary code digits in turn, may, for example, be translated into decimal code digits. In a system such as herein envisaged, at least four digits of a multidigit code are required to implement the control of the circuitry. These four digits may, for example, appear in the following order: P D S C; and wherein the said digits respectively represent an equivalent number, letter, character or symbol. These four digits have the following significance: P indicates the degree of priority to be afforded to a particular message, D indicates the geographical direction in which the message is to progress, and S and C together indicate the specific switching center of destination to which the message is to be directed; and D, S, and C in combination constitute the route code.

Priority

In the exemplary disclosure, it will be assumed that if the priority (P) digit is any number other than an "8" or a "9" the respectively associated message is of ordinary or "no priority," and will be recognized as an NP message. Such (NP) calls are accorded no special treatment, but merely have access to any currently available appropriate trunk path. It is also assumed that if the priority (P) digit is "9" the message respectively associated therewith is a "right-of-way" (ROW) message.

In the case of a right-of-way (ROW) message, an idle trunk will be sought in the first choice trunk group even though all trunks therein may be busy, and, if the last trunk in the said first choice trunk group is busy with any call other than an ROW call, the said last trunk of said first choice group will be pre-empted or "bumped-off" to serve the ROW call. If, on the other hand, the last trunk of the first choice trunk group is busy with an ROW call, the trunk selecting equipment will route-advance to seek an idle trunk in another trunk group wherein if all trunks are busy the last trunk is not busy with an ROW call. If all of the trunks in all of the trunk groups are busy and if all of the last trunks in said groups are busy with ROW calls, the trunk selecting equipment will route-advance to effect connection to a reorder trunk.

Destination

The destination code, represented by the letters S and C together, comprises any two digit number representative of any correspondingly numbered switching center of destination to which the instant switching center may be connected, via any available appropriate trunk group.

Trunk hunting, nonpriority (NP)

Figure 3:
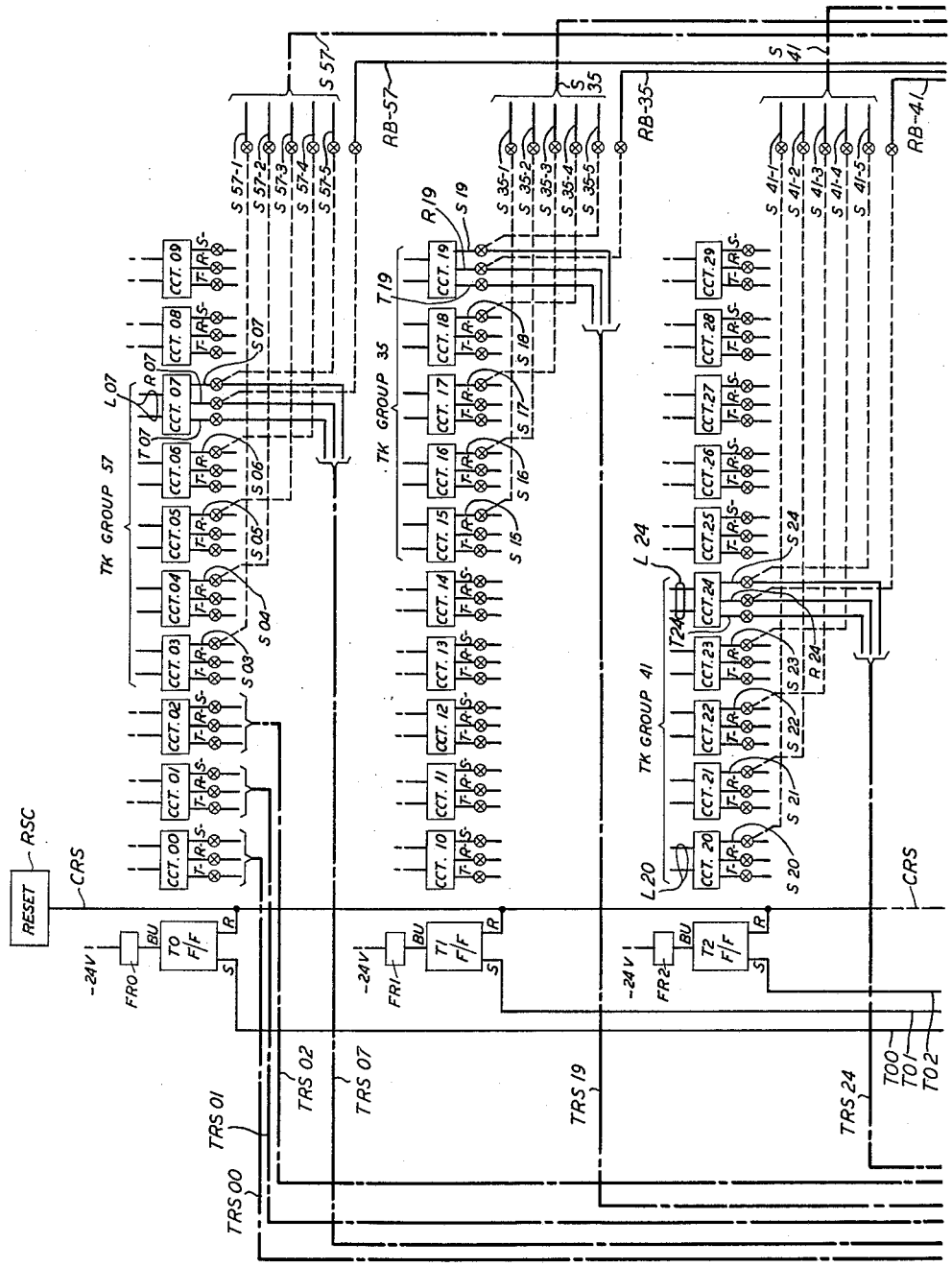
Figure 4:
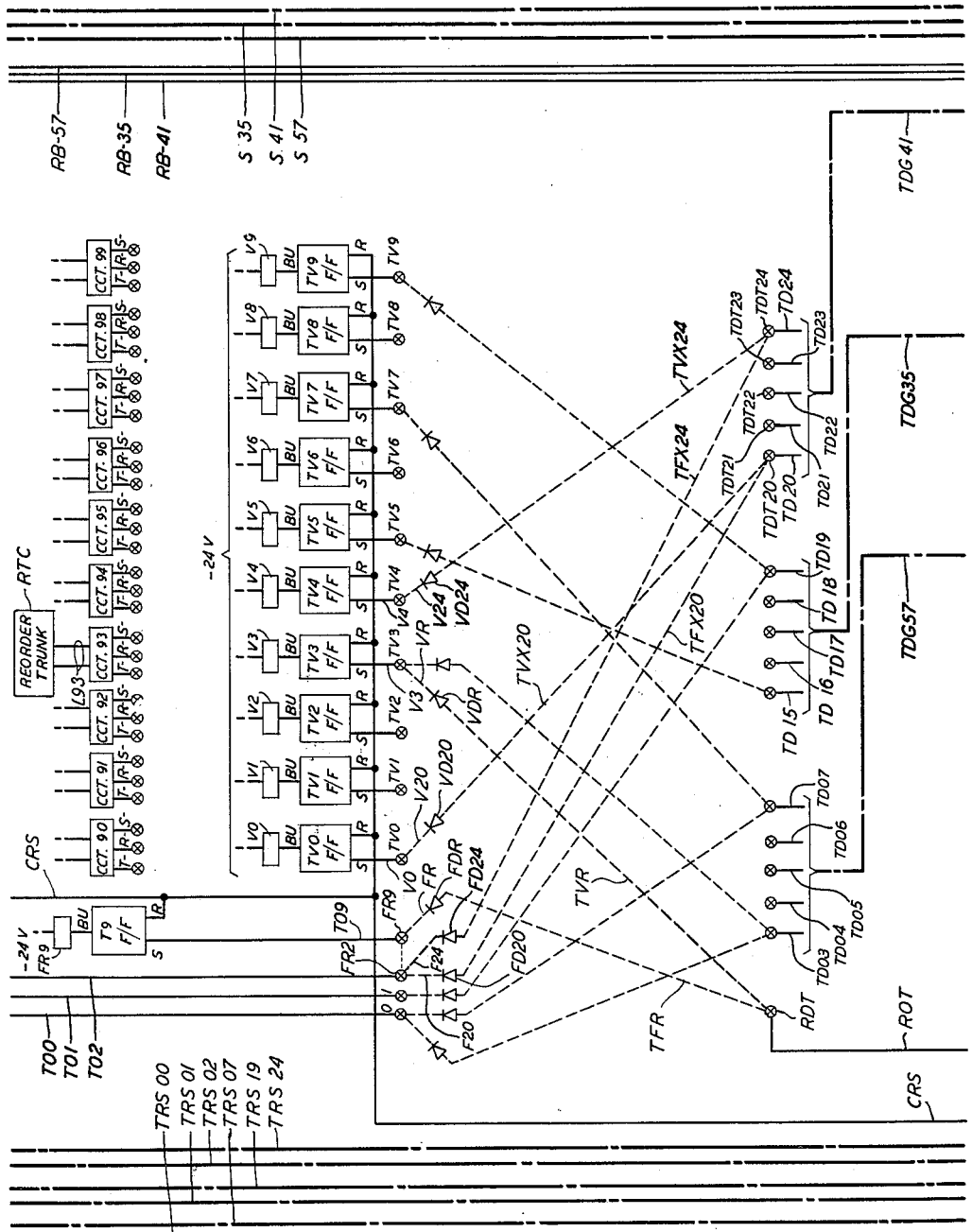
Figure 5:
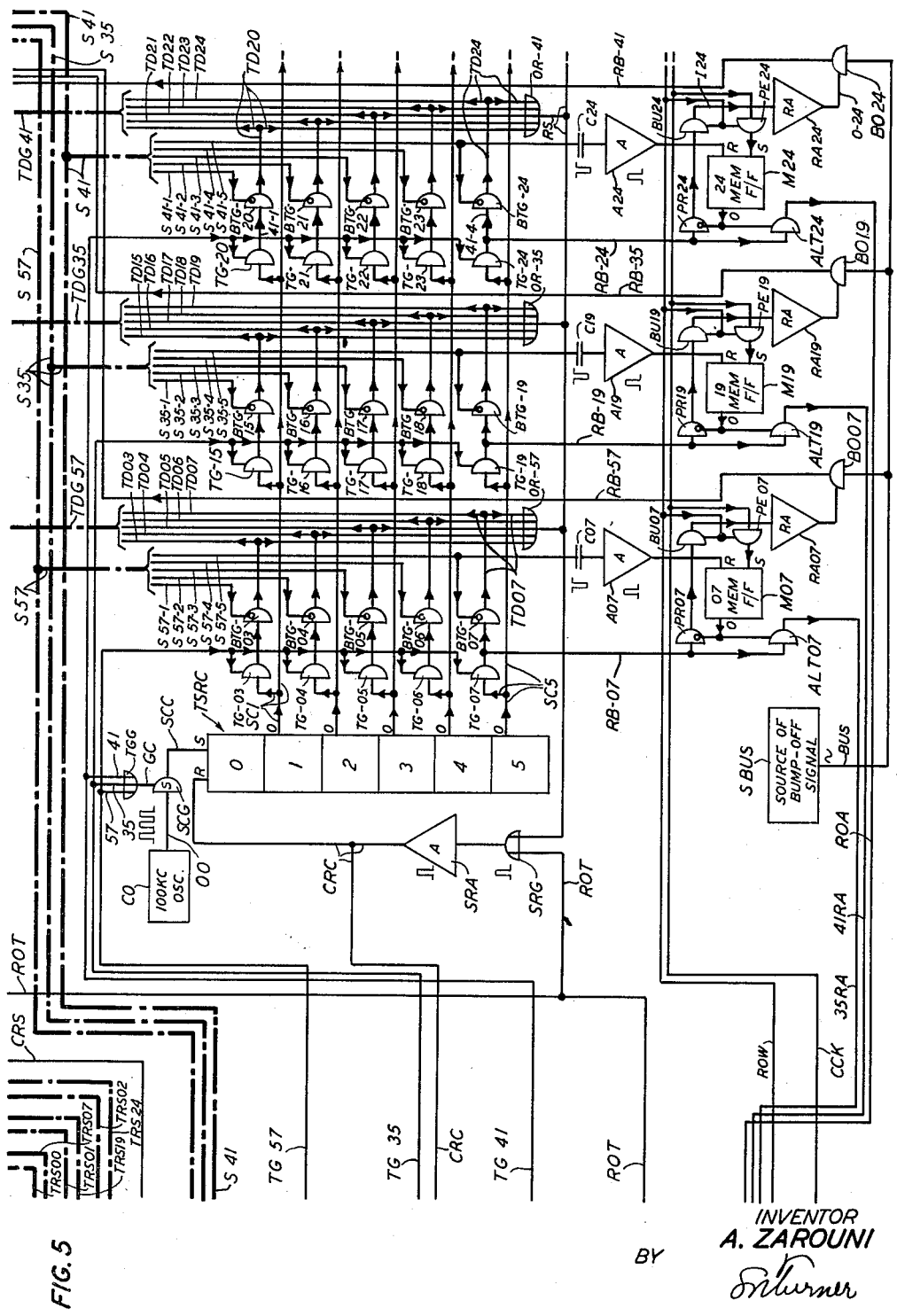
Figure 6:
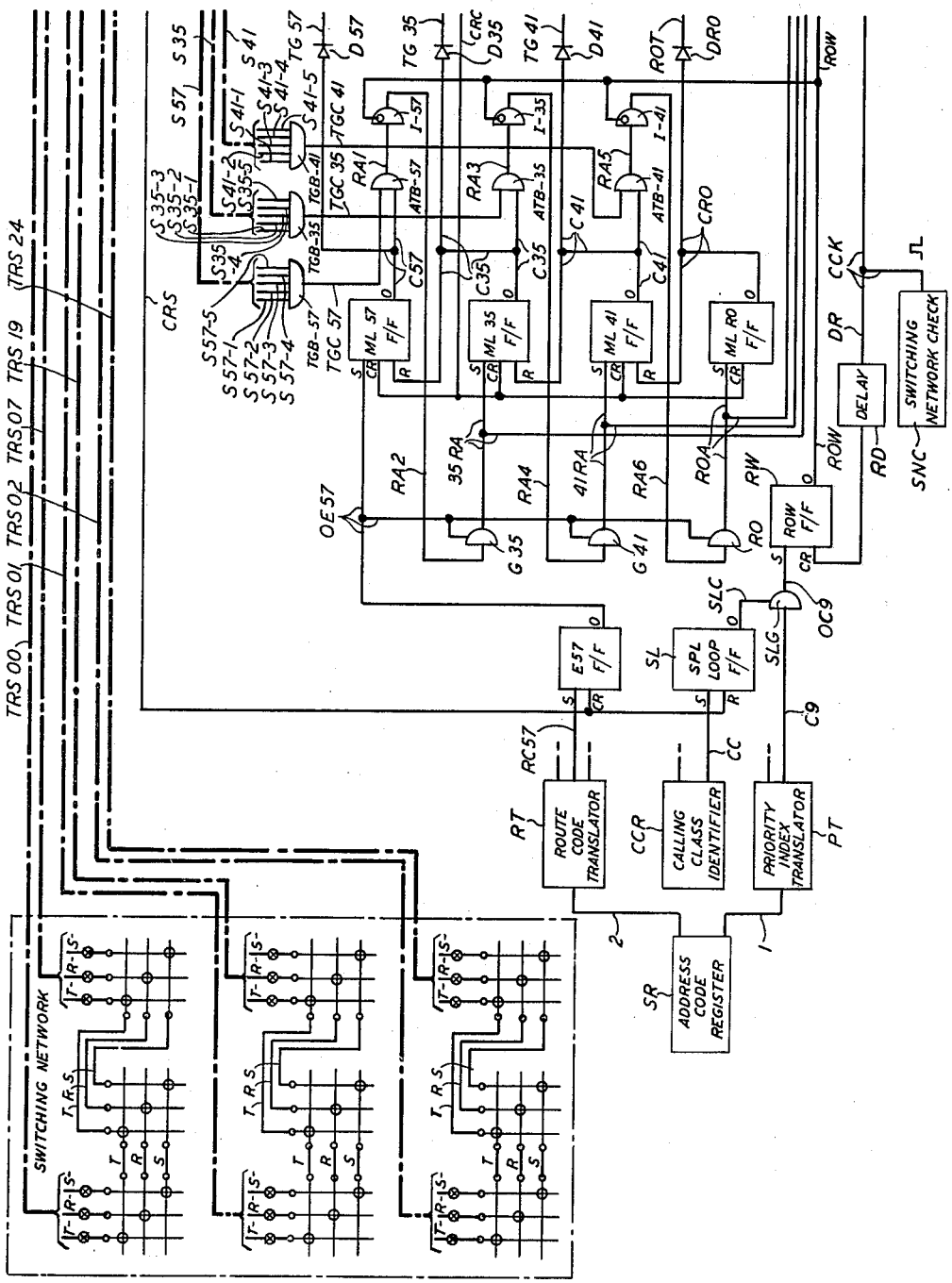
Figure 7A:
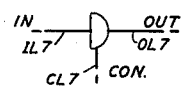
Figure 7B:
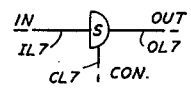
Figure 7C:
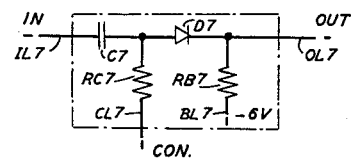
Figure 9A:
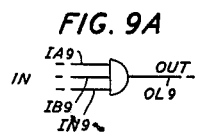
Figure 9B:
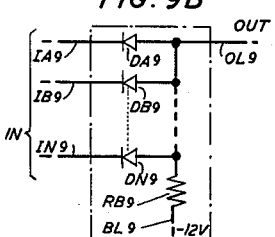
Figure 8A:
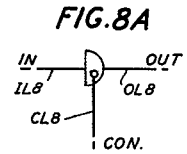
Figure 8B:
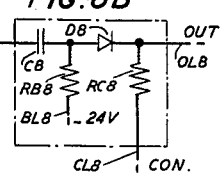
Figure 10A:
Figure 10B:
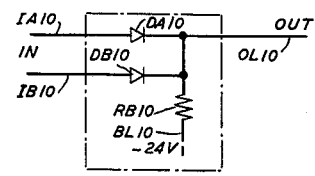
Figure 11A:
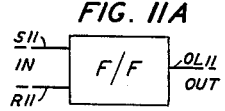
Figure 11B:
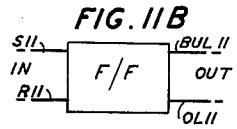
Figure 11C:
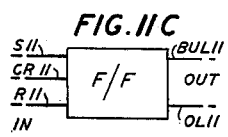
Figure 11D:
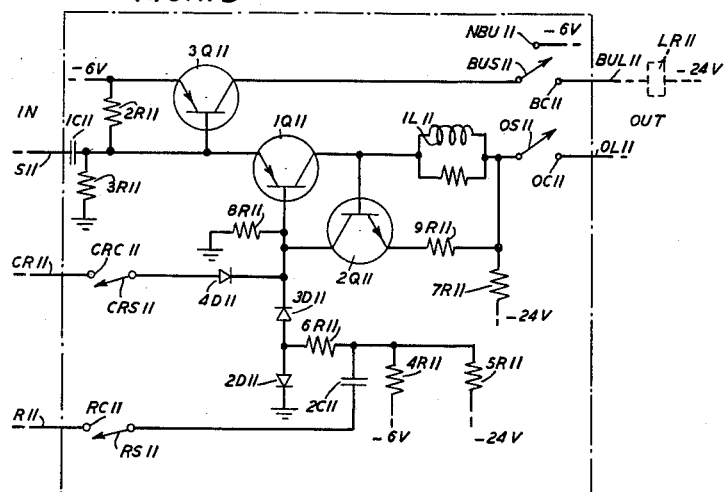

Let it be assumed that the instant switching center is servicing a message which has associated therewith a multidigit address code having included therein as the respective numerical equivalents of the significant digits P, D, S, and C, the combination 2957, for example. The combinations of electrical impulses received at the instant switching center, and respectively representing digits P, D, S, and C in binary code, are stored in the address code (or digital register) SR (FIG. 6). The priority (P) digit code output of register SR is transmitted, via path 1, to the priority index translator PT (FIG. 6); and the D, S, and C digit code outputs of register SR are transmitted, via path 2, to the route code translator RT (FIG. 6). Since the priority (P) digit is, in this instance, assumed to be a "2," the priority index translator PT (FIG. 6) recognizes the P digit as being indicative of a low-priority (NP) message, thereby eliciting a negative or ineffective response. The D, S, and C digits, respectively assumed to be "9," "5" and "7" are recognized by the route code translator RT (FIG. 6) which produces an electrical potential change (or positive potential) on its output conductor RC57. The electrical potential change on conductor RC57 is applied to the "SET" conductor S of flip-flop E57 (FIG. 6), causing flip-flop E57 to operate and produce an electrical potential change (or positive potential) on its "OUT" conductor OE57. The operation of flip-flop E57 indicates that the message is to progress in an easterly direction and that the switching center 57 is the switching center of destination. The electrical potential change on conductor OE57 is applied to the "SET" conductor S of corresponding route advance flip-flop ML57 (FIG. 6), the output of which, in turn, energizes corresponding trunk hunting circuitry (FIG. 5), thereby causing an idle trunk to be successively sought, in a predetermined order of preference, among the several trunk groups embraced in that particular trunk group route-advance pattern. If an idle trunk is found in any one of the trunk groups, the trunk hunting equipment will energize designating equipment (FIGS. 3 and 4) to designate said idle trunk for interconnection. If all of the trunks in all of the trunk groups of the route-advance pattern are busy, the route advance circuitry (FIG. 6) will route-advance to designate connection to a reorder trunk (FIG. 4).

Class-of-service

The calling class identifier or register CCR (FIG. 6) ascertains, by suitable means known in the prior art, whether or not the line or trunk incoming from a preceding switching center (or station) to the instant switching center, over which the multidigit address code was received, is entitled to forward a message on an ROW (right-of-way) service basis. If the identifier or register CCR (FIG. 6) ascertains that the incoming call is entitled to ROW service, register CCR "remembers" that the incoming line or trunk is entitled to such ROW service and causes an electrical potential change (or positive potential) to appear on its output conductor CC. The electrical potential change on conductor CC is applied to the "SET" conductor S of the special loop flip-flop SL (FIG. 6), causing flip-flop SL to operate and produce an electrical potential change (or positive potential) on its "OUT" conductor SLC. The electrical potential change on conductor SLC is applied to the control conductor of transmission enabling gate SLG (FIG. 6), causing gate SLG to become enabled.

Trunk hunting, right-of-way (ROW)

Now let it be assumed that the instant switching counter is servicing a message which has associated therewith a multidigit address code having included therein as the respective numerical equivalents of the significant digits P, D, S, and C, the combination 9957, for example. The combinations of electrical impulses received at the instant switching center, and respectively representing digits P, D, S, and C in binary code, are stored in the address code (or digital register SR [FIG. 6]); and the P digit code output, and the D, S, and C digit code outputs of register SR, are transmitted, via paths 1 and 2, respectively, to translators PT and RT, respectively (FIG. 6), as previously described. Since the priority (P) digit is, in this instance, assumed to be a "9," the priority index translator PT (FIG. 6) recognizes the P digit as being indicative of a right-of-way (ROW) message, thereby causing translator PT to transmit a corresponding "9" decimal output, via conductor C9, the enabled gate SLG, and the conductor OC9, to the "SET" conductor S of right-of-way flip-flop RW (FIG. 6), causing flip-flop RW to operate and produce an electrical potential change (or positive potential) on its "OUT" conductor ROW. The electrical potential change on conductor ROW is applied to the route advance circuitry (FIG. 6) and to the trunk hunting circuitry (FIG. 5), thereby inhibiting or modifying the regular operation of the route advance equipment, and, at the same time, enabling certain portions of the trunk hunting circuitry, thereby permitting the trunk hunting equipment to accord "bump-off" or pre-emptive privileges to the "right-of-way" call being processed. Since the instant ROW message has associated therewith the same numerical equivalents for the digits D, S, and C as in the previously described NP message, the outputs of the route code translator RT (FIG. 6) will be the same, and will, in the same manner as previously stated, control the functioning of the route advance equipment and the trunk hunting equipment, with the exception, however, as above noted, that the ROW code will inhibit or modify the regular operation of the route advance equipment.

TRACING TYPICAL CALLS

To further facilitate an understanding of the operation of the system, several typical calls will be discussed and the concomitant circuit operations will be traced in detail.

Nonpriority message

As a first example, let it be assumed that a nonpriority (NP) message is in process of being served by the instant switching center. Let it be further assumed that this NP message has associated therewith a multidigit address code having included therein, as the respective equivalents of the significant digits P, D, S, and C, the digital combination 2957, for example. The combinations of electrical impulses received at the instant switching center, and respectively representing digits P, D, S, and C, are transmitted, as previously described, to translators PT and RT (FIG. 6). Since the P digit is, in this instance, assumed to be a "2" and, as previously described, is indicative of an NP message, translator PT will produce a negative response, thereby apprising the trunk selecting equipment that this is a low-priority or NP message, as previously explained. Since the D, S, and C digits are, in this instance, assumed to be "9," "5" and "7," respectively, the route code translator RT (FIG. 6) produces an electrical potential change (or positive potential) on its output conductor RC57, thereby causing the operation of flip-flop E57 (FIG. 6), as previously described.

The operation of flip-flop E57, in the instant example, indicates that the message is to proceed in an easterly direction, with switching center 57 as the switching center of destination. Flip-flop E57, in its operated condition, causes an electrical potential change (or positive potential) to appear on its "OUT" conductor OE57. The electrical potential change on conductor OE57 is applied to the "SET" conductor S of flip-flop ML57 and to the parallel-connected control conductors of transmission enabling gates G35, G41 and RO (FIG. 6), thereby causing flip-flop ML57 to operate, and also causing the said gates to be enabled. The operation of flip-flop ML57, in the instant example, indicates that trunk group 57 is the first choice in which to seek an idle trunk to switching center 57.

Trunk hunting

The operation of flip-flop ML57 (FIG. 6) causes an electrical potential change (or positive potential) to appear on its "OUT" conductor C57. The electrical potential change on conductor C57 is transmitted, via diode D57 (FIG. 6) and conductor TG57, to one of the input conductors of the trunk group "OR" gate TGG (FIG. 5), and to the parallel-connected control conductors of all of the transmission enabling gates TG-03 through TG-07 (FIG. 5), thereby enabling said "OR" gate and said transmission enabling gates. The enablement of "OR" gate TGG causes it to transmit an electrical potential change (or positive potential), via conductor GC, to the control conductor of the slow-acting transmission enabling gate SCG (FIG. 5). If the interval during which the positive potential is applied to the control conductor of the slow-acting gate SCG is of sufficient duration, the 100 kilocycle oscillator CO (FIG. 5) will transmit a pulse, via conductor O0, gate SCG and conductor SCC, to the "START" conductor S of the trunk scanning ring counter TSRC (FIG. 5), thereby causing the ring counter TSRC to start its trunk scanning cycle whereby to seek an idle trunk in the trunk group designated by the operation of the route advance flip-flop ML57. The delay interval inherent in slow-acting gate SCG is of sufficient duration to prevent the starting of ring counter TSRC (FIG. 5) before the operation of the route advance flip-flop indicative of the next trunk group choice (e.g., ML35) and before the resetting of the previously-operated route advance flip-flop (e.g., ML57). This slow-acting characteristic of gate SCG is of importance in the event that all of the trunks are busy in the trunk group designated by the previously-operated flip-flop (e.g., trunk group 57 designated by the operation of flip-flop ML57). At the same time, the electrical potential change on conductor C57 is also applied to the lower input conductor of all trunks busy "AND" gate ATB-57 (FIG. 6).

Trunk groups

Digressing from the operation of the trunk scanning circuitry—the general organization of the trunk groups and the circuitry germane thereto will now be described. In the exemplary disclosure of the invention, a plurality of lines or trunks are provided, together with terminating circuits therefor, and means for designating certain of said lines or trunks for interconnection (FIGS. 3 and 4). Each line or trunk (e.g., L07, FIG. 3) is terminated in a terminating circuit (e.g. CCT.07, FIG. 3) The purpose of such a terminating circuit is to afford means for coupling the conductors of a line or trunk to a switching network, and to provide means for furnishing a supervisory signal or signals indicative of the idle or busy status of said line or trunk. To furnish such a supervisory signal or signals, each such terminating circuit (e.g., CCT.07, FIG. 3) is provided with a sleeve (S) conductor (e.g., S07, FIG. 3). To furnish communication paths, each such terminating circuit (e.g., CCT.07, FIG. 3) is provided with a tip (T) and a ring (R) conductor (e.g., T07 and R07, FIG. 3). The several sets of T, R and S conductors are respectively connected to correspondingly numbered cross-connecting terminals, thereby providing for flexibility of cross-connection to the switching network and trunk selecting equipment.

The lines or trunks are resolved into trunk groups. In the exemplary disclosure, each such trunk group consists of not more than five trunks; trunk group 57, for example, comprises trunks 03 through 07 (FIG. 3). In the exemplary disclosure, the number of trunks per group is limited to five because the trunk scanning ring counter TSRC (FIG. 5) employs five stages in addition to the "START" stage. A greater or a less number of trunks per group may be had by providing the trunk scanning ring counter with a greater or a less number of stages. The sleeve conductors of trunk group 57, for example, consisting of conductors S03, S04, S05, S06, and S07 (FIG. 3) are respectively cross-connected to sleeve conductors S57-1, S57-2, S57-3, S57-4, and S57-5 in cable S57 (FIG. 3), and thereover respectively connected to the control conductors of the busy test transmission inhibiting gates BTG-03, BTG-04, BTG-05, BTG-06, and BTG-07 (FIG. 5) and to the input conductors S57-1, S57-2, S57-3, S57-4 and S57-5 respectively, of the trunk group busy "AND" gate TGB-57 (FIG. 6). In a similar manner, the sleeve conductors of trunk groups 35 and 41 (FIG. 3) are connected to the control conductors of the busy test transmission inhibiting gates BTG– (FIG. 5) and to the input conductors of the trunk group busy gates TGB– (FIG. 6) respectively corresponding thereto.

Sleeve conductor supervisory signals

In the exemplary disclosure of the invention, the terminating circuits (e.g., CCT.03, FIG. 3) are assumed to be if a type known in the art, wherein when the line or trunk is idle the sleeve conductor (e.g., S03) is normally at a negative potential, and when the line or trunk is in use the sleeve conductor assumes a ground (or positive) potential, thereby giving an "off-hook" or busy signal. During the interval that the line or trunk is being restored to an idle condition, the sleeve conductor puts out a negative-going pulse.

Now let it be assumed, for example, that all of the trunks of trunk group 57 (FIG. 3) are busy. Under this condition, all of the sleeve conductors S03, S04, S05, S06, and S07 of trunk group 57 will be at ground (or positive) potential, which potentials are applied, via the previously-described path, to the control conductors of gates BTG-03, BTG-04, BTG-05, BTG-06, and BTG-07, respectively (FIG. 5), thereby disabling all of said gates. The ground (or positive) potentials on the sleeve conductors S03, S04, S05, S06, and S07 are also applied, via the previously-described path, to the correspondingly numbered input conductors of "AND" gate TGB-57 (FIG. 6). With the concurrent application of ground (or positive) potentials to all of the inputs of gate TGB-57, an electrical potential change (or positive potential) appears on output conductor TGC57, thereby indicating that all of the trunks in trunk group 57 are busy. Under this condition, the electrical potential change (or positive potential) on conductor TGC57 is applied to the upper input conductor of all trunks busy "AND" gate ATB-57 (FIG. 6). The lower input conductor of "AND" gate ATB-57, at this time, also has a positive potential applied thereto, as previously described. The concurrent application of positive potentials to both of the input conductors of "AND" gate ATB-57 (FIG. 6) causes an electrical potential change (or positive potential) to appear on its output conductor RA1. At this time, since this is not a right-of-way (ROW) message, there will be no "disabling" potential on conductor ROW; and, therefore, the transmission inhibiting gates I-57, I-35, and I-41 (FIG. 6) having their control conductors parallel-connected to conductor ROW will be in their enabled states.

Route advance

Gate G35 (FIG. 6), it will be remembered, is also in its enabled state. Therefore, the positive output potential on conductor RA1 is transmitted, via gate I-57, conductor RA2, gate G35 (FIG. 6), and conductor 35RA, to the "SET" conductor S of route advance flip-flop ML35 (FIG. 6), causing flip-flop ML35 to operate and produce an electrical potential change (or positive potential) on its "OUT" conductor C35. The operation of flip-flop ML35, in the instant example, indicates that trunk group 35 is the second choice in which to seek an idle trunk, and whereby indirect access may be had to switching center 57. Since it was assumed that all of the trunks in trunk group 57 are busy, it is obvious that the search for an idle trunk in trunk group 57 would be fruitless. Therefore, under this condition, by virtue of the previously-described delay inherent in slow-acting gate SCG (FIG. 5), the trunk scanning ring counter TSRC (FIG. 5) was prevented from starting, thereby preventing the seeking of an idle trunk in trunk group 57. The electrical potential change (or positive potential) on conductor C35 is transmitted, via diode D35 (FIG. 6) and conductor TG35, to the correspondingly numbered input conductor of "OR" gate TGG (FIG. 5) and to the parallel-connected control conductors of all of the transmission enabling gates TG-15 through TG-19 (FIG. 5), thereby again enabling said "OR" gate, and enabling said transmission enabling gates. The enablement of "OR" gate TGG again initiates the conditional operation of slow-acting gate SCG (FIG. 5) which, in turn, again initiates the conditional start of the ring counter TSRC (FIG. 5), in the manner previously described. At the same time, the electrical potential change (or positive potential) on conductor C35 is also applied to the lower input conductor of all trunks busy "AND" gate ATB-35 (FIG. 6). Also, at the same time, the electrical potential change (or positive potential) on conductor C35 is applied to the reset conductor R of route advance flip-flop ML57 (FIG. 6), causing flip-flop ML57 to be turned-off or reset.

Now let it be assumed, for example, that all of the trunks of trunk group 35 (FIG. 3) are busy. Under this condition, all of the sleeve conductors S15, S16, S17, S18, and S19 of trunk group 35 will be at ground (or positive) potential, which potentials are applied, via a path similar to that previously described with reference to trunk group 57, to the control conductors of gates BTG-15, BTG-16, BTG-17, BTG-18, and BTG-19, respectively (FIG. 5), thereby disabling all of said gates. The ground (or positive) potentials on the sleeve conductors S15, S16, S17, S18, and S19 are also applied, via a path similar to that previously described with reference to trunk group 57, to the correspondingly numbered input conductors of "AND" gate TGB-35 (FIG. 6). The concurrent application of ground (or positive) potentials to all of the inputs of gate TGB-35 causes an electrical potential change (or positive potential) to appear on its output conductor TGC-35, thereby indicating that all of the trunks in trunk group 35 are busy. Under this condition, the electrical potential change (or positive potential) on conductor TGC-35 is applied to the upper input conductor of all trunks busy "AND" gate ATB-35 (FIG. 6). The lower input conductor of "AND" gate ATB-35 (FIG. 6), at this time, also has a positive potential applied there, as previously described. The concurrent application of positive potentials to both of the input conductors of "AND" gate ATB-35 (FIG. 6) causes an electrical potential change (or positive potential) to appear on its output conductor RA3. At this time, since, as previously assumed, this is not an ROW message, there will be no "disabling" potential on the control conductor of gate I–35 (FIG. 6), and, therefore, gate I–35 will be in its enabled state. Gate G41 (FIG. 6), it will be remembered, is also in its enabled state. Therefore, the positive output potential on conductor RA3 is transmitted, via gate I–35, conductor RA4, gate G41 (FIG. 6) and conductor 41RA, to the "SET" conductor S of route advance flip-flop ML41 (FIG. 6), causing flip-flop ML41 to operate and produce an electrical potential change (or positive potential) on its "OUT" conductor C41. The operation of flip-flop ML41, in the instant example, indicates that trunk group 41 is the third choice in which to seek an idle trunk, and whereby indirect access may be had to switching center 57. Since all of the trunks in trunk group 35 were assumed to be busy (for reasons previously explained), the trunk scanning ring counter TSRC (FIG. 5) was prevented from starting, thereby preventing the fruitless seeking of an idle trunk in trunk group 35. The electrical potential change (or positive potential) on conductor C41 is transmitted, via diode D41 (FIG. 6) and conductor TG41, to the correspondingly numbered input conductor of "OR" gate TGG (FIG. 5) and to the parallel-connected control conductors of all of the transmission enabling gates TG–20 through TG–24 (FIG. 5), thereby again enabling said "OR" gate, and enabling said transmission enabling gates. At the same time, the electrical potential change (or positive potential) on conductor C41 is also applied to the lower input conductor of all trunks busy "AND" gate ATB–41 (FIG. 6). Also, at the same time, the electrical potential change (or positive potential) on conductor C41 is applied to the reset conductor R of route advance flip-flop ML35 (FIG. 6), causing flip-flop ML35 to be turned-off or reset.

Now let it be assumed, for example, that the first (i.e., L20) in trunk group 41 (FIG. 33 is idle and that the remaining trunks in trunk group 41 are busy. Under this condition, the sleeve conductor S20 (FIG. 3) will be at a negative potential, and the remaining sleeve conductors S21, S22, S23, and S24 of trunk group 41 will be at ground (or positive) potential. These sleeve potentials are applied, via a path similar to that previously described with reference to trunk group 57, to the control conductors of gates BTG–20, BTG–21, BTG–22, BTG–23, and BTG–24, respectively (FIG. 5), thereby enabling gate BTG–20, and, at the same time, disabling gates BTG–21 through BTG–24. The said potentials on the sleeve conductors S20, S21, S22, S23, and S24 are also applied, via a path similar to that previously described with reference to trunk group 57, to the correspondingly numbered input conductors of "AND" gate TBG–41 (FIG. 6). Since less than all of the input conductors of "AND" gate TBG–41 have ground (or positive) potentials connected thereto, the output conductor of the "AND" gate TBG–41 will remain at its normal potential, that is to say, gate TBG–41 will not produce an electrical potential change (or positive potential) on its output conductor TGC41. The absence of an electrical potential change (or positive potential) on conductor TGC41 indicates that there is at least one idle trunk in trunk group 41. Under this condition, the normal potential on conductor TGC41 is applied to the upper input conductor of all trunks busy "AND" gate ATB–41 (FIG. 6). The lower input conductor of "AND" gate ATB–41, at this time, has a positive potential applied thereto, as previously described. At this time, since, as previously assumed, this is not an ROW message, there will be no "disabling" potential on the control conductor of gate I–41 (FIG. 6), and, therefore, gate I–41 will be in its enabled state. But since, at this time, only one of the input conductors of "AND" gate ATB–41 is supplied with a positive potential, and "AND" gate ATB–41 will not produce an electrical potential change (or positive potential) on its output conductor RA5. The enablement of "OR" gate TGG (FIG. 5) causes it to transmit an electrical potential change (or positive potential), via conductor GC, to control conductor of the slow-acting transmission inhibiting gate SCG (FIG. 5). Since it is assumed that there is at least one idle trunk in trunk group 41 (i.e., trunk L20—the first trunk in trunk group 41), after the slow-acting gate SCG has had a sufficient time in which to operate, the 100 kilocycle oscillator CO (FIG. 5) will transmit a pulse, via conductor OO, gate SCG and conductor SCC, to the "START" conductor S of the trunk scanning ring counter TSRC (FIG. 5), thereby causing the ring counter TSRC to start its trunk scanning cycle. When the ring counter TSRC has advanced to its No. 1 stage, an electrical potential change (or positive potential) will be transmitted from stage No. 1, via conductor SC1, to the parallel-connected input conductors of transmission enabling gates TG03, TG–15, and TG–20 (FIG. 5). Gate TG–20, it will be remembered, is enabled at this time by virtue of the positive potential applied to its control conductor; and transmission inhibiting gate BTG–20, it will be remembered, is also enabled at this time by virtue of the negative potential (idle trunk sleeve) on its control conductor. Therefore, under this condition, the electrical potential change (or positive potential) output of the No. 1 stage of ring counter TSRC (FIG. 5) on conductor SC1 will be transmitted, via gate TG–20 (FIG. 5), conductor 41–1 and gate BTG–20 (FIG. 5), to the trunk designating conductor TD20. The electrical potential change (or positive potential) on conductor TD20 is applied to the correspondingly numbered input conductor of "OR" gate OR–41 (FIG. 5), thereby enabling gate OR–41. The enablement of gate OR–41 causes it to transmit an electrical potential change (or positive potential), via conductor RS, to the right-hand input conductor of "OR" gate SRG (FIG. 5), thereby enabling gate SRG. The enablement of gate SRG causes it to transmit an electrical potential change (or positive potential), via amplifier SRA (FIG. 5) and conductor CRC, to the reset conductor R of ring counter TSRC (FIG. 5), thereby causing the trunk hunting cycle of ring counter TSRC to cease, and causing said ring counter to be reset to its No. 0 stage. At the same time, the electrical potential change (or positive potential) on conductor TD20 in cable TDG41 is transmitted to the trunk-designating cross-connecting terminal TDT20 (FIG. 4). The electrical potential change (or positive potential) applied to terminal TDT20 is transmitted, via cross-connection TVX20, diode VD20 (FIG. 4), conductor V20, cross-connecting terminal TV0 (FIG. 4), and conductor V0, to the "SET" conductor S of the vertical flip-flop TV0 (FIG. 4), thereby causing flip-flop TV0 to operate. The electrical potential change applied to terminal TDT20 (FIG. 4) is also transmitted, via cross-connection TFX20, diode FD20 (FIG. 4), conductor F20, cross connecting terminal FR2 (FIG. 4), and conductor T02, to the "SET" conductor S of the frame flip-flop T2 (FIG. 3), thereby causing flip-flop T2 to operate. The operation of flip-flop TV0 (FIG. 4) causes it to produce an electrical potential change (or positive potential) on its output conductor BU, which positive potential is extended through the winding of relay V0 (FIG. 4) to —24 volts, causing relay V0 to operate. The operation of flip-flop T2 (FIG. 3) causes it to produce an electrical potential change (or positive potential) on its output conductor BU, which positive potential is extended through the winding of relay FR2 (FIG. 3) to —24 volts, causing relay FR2 to operate. The concurrent operation of relays V0 and FR2 comprises the designation of trunk L20 (FIG. 3) for interconnection. Any suitable switching system known in the art may be employed to effect the interconnection. A switching system particularly adapted for this purpose is disclosed and claimed in Patent 3,041,409 to A. Zarouni of June 26, 1962, and entitled Switching System. Portions of the trunk hunting and route advance circuitry of the instant application are disclosed and claimed in Patent 3,155,775 to A. Zarouni of November 3, 1964. The electrical potential change (or positive potential) on the output conductor CRC of amplifier SRA (FIG. 5) is also applied to the parallel-connected common reset conductors CR of all of the route advance flip-flops of FIG. 6 (e.g., ML41), thereby causing all of these flip-flops that are turned-on or set at this time to be turned-off or reset.

Now, at this time, let it be assumed that a suitable idle path has been found available in the switching network for interconnecting the incoming line or trunk to the outgoing line or trunk. The availability of such an idle connecting path is evidenced by the operation of the switching network check circuit SNC (FIG. 6), thereby causing an electrical potential change (or positive potential) to appear on its output conductor CCK. The electrical potential change on conductor CCK is applied to the parallel-connected input conductors of transmission enabling gates PE07, PE19 and PE24 (FIG. 5); but, since this is not an ROW message, the said gates will not be enabled at this time, and, hence, the said potential on conductor CCK produces no useful effect with respect to said gates. The electrical potential change on conductor CCK is also applied to the input conductor DR of delay circuit RD (FIG. 6), and, after a brief delay interval, is transmitted therethrough to the reset conductor CR of the right-of-way flip-flop RW (FIG. 6); but since this is not an ROW message, the flip-flop ROW will not be in its set or turned-on condition at this time, and, hence, the resetting potential applied thereto will produce no useful effect. Now, at a time shortly subsequent to the operation of the switching network check circuit SNC (FIG. 6), let it also be assumed that the designated trunking path has been established. Under this condition, let it be further assumed that a suitable reset circuit known in the art, and represented by the rectangle designated RSC (FIG. 3), takes cognizance of the establishment of a trunking path and, as a result thereof, causes a positive output potential to appear on its output conductor CRS. The positive potential on conductor CRS is applied to all of the parallel-connected reset conductors R of all of the trunk-designating flip-flops of FIGS. 3 and 4, to the common reset conductor CR of the flip-flop E57 of FIG. 6, and to the reset conductor R of flip-flop SL of FIG. 6, thereby causing all of the flip-flops that are turned-on or set at this time to be turned-off or reset. With all of the flip-flops restored to their reset or turned-off condition, the system is in readiness to service another message.

*Reorder*

Now, as an alternative condition incident to seeking an idle trunk to switching center 57, let it be further assumed, for example, that, as above described, not only are all of the trunks in trunk groups 57 and 35 busy, but also that all of the trunks in trunk group 41 are busy. Under this condition, all of the sleeve conductors S20 through S24 (FIG. 3) of trunk group 41 will be at ground (or positive) potential; all of the input conductors of trunk group busy "AND" gate TGB-41 (FIG. 6) will be at ground (or positive) potential; and both of the input conductors of all trunks busy "AND" gate ATB-41 (FIG. 6) will be at a positive potential, thereby enabling "AND" gate ATB-41. The electrical potential change (or positive potential) on the output conductor C41 of flip-flop ML41 (FIG. 6) is transmitted, via diode D41 (FIG. 6), conductod TG41, and "OR" gate TGG (FIG. 5), as previously described, thereby again initiating the conditional operation of slow-acting gate SCG. Since, in this instance, all of the trunks in trunk group 41 are assumed to be busy, the operation of the ring counter TSRC (FIG. 5) will be prevented by virtue of the delay inherent in slow-acting gate SCG, as previously described with reference to trunk group 57. At this time, since, as previously assumed, this is not an ROW message, there will be no "disabling" potential on conductor ROW; and, therefore, the transmission inhibiting gate I-41 (FIG. 6) will be in its enabled state.

Gate RO (FIG. 6), it will be remembered, is also in its enabled state. Therefore, the electrical potential change (or positive potential) on the output conductor C41 of flip-flop ML41 (FIG. 6) is transmitted, via gate ATB-41 (FIG. 6), conductor RA5, gate I-41 (FIG. 6), conductor RA6, gate RO (FIG. 6), and conductor ROA, to the "SET" conductor S of route advance recorder flip-flop MLRO (FIG. 6), causing flip-flop MLRO to operate and produce an electrical potential change (or positive potential) on its "OUT" conductor CRO. The operation of flip-flop MLRO, in the instant example, indicates that no trunk is idle in any of the trunk groups (i.e., 57, 35 and 41) included in that route advance pattern wherein switching center 57 is the required destination. The electrical potential change (or positive potential) on conductor CRO is transmitted, via diode DRO (FIG. 6) and conductor ROT, to the reorder trunk-designating cross-connecting terminal RDT (FIG. 4). At the same time, the electrical potential change (or positive potential) on conductor CRO is applied to the reset conductor R of route advance flip-flop ML41 (FIG. 6), causing flip-flop ML41 to be turned-off or reset. Also, at the same time, the electrical potential change (or positive potential) on conductor ROT is applied to the left-hand input conductor of "OR" gate SRG (FIG. 5), thereby enabling gate SRG. The enablement of "OR" gate SRG causes it to transmit an electrical potential change (or positive potential), via amplifier SRA (FIG. 5) and conductor CRC, to the parallel-connected common reset conductors CR of all of the route advance flip-flops of FIG. 6, thereby causing the resetting or turning-off of flip-flop MLRO and all of the other of said flip-flops that may be operated or turned-on at this time. The electrical potential change (or positive potential) applied to terminal RDT (FIG. 4) is transmitted, via cross-connection TVR, diode VDR (FIG. 4), conductor VR, cross-connecting terminal TV3 (FIG. 4), and conductor V3, to the "SET" conductor S of the vertical flip-flop TV3 (FIG. 4), thereby causing flip-flop TV3 to operate. The electrical potential change applied to terminal RDT (FIG. 4) is also transmitted, via cross-connection TFR, diode FDR (FIG. 4), conductor FR, cross-connecting terminal FR9 (FIG. 4), and conductor T09, to the "SET" conductor S of the frame flip-flop T9 (FIG. 4), thereby causing flip-flop T9 to operate. The operation of flip-flop TV3 (FIG. 4) causes it to produce an electrical potential change (or positive potenital) on its output conductor BU, which positive potential is extended through the winding of relay V3 (FIG. 4) to —24 volts, causing relay V3 to operate. The operation of flip-flop T9 (FIG. 4) causes it to produce an electrical potential change (or positive potential) on its output conductor BU, which positive potential is extended through the winding of relay FR9 (FIG. 4) to —24 volts, causing relay FR9 to operate. The concurrent operation of relays V3 and FR9 comprises the circuit operation, in an aforementioned switching system, whereby the reorder trunk (i.e., L93, FIG. 4) is designated for interconnection. The reorder trunk is terminated in a suitable reorder trunk circuit known in the art, and represented by the rectangle designated RTC (FIG. 4). Said reorder trunk circuit, it will be assumed, provides means whereby a signal may be furnished to indicate to the calling facility that all of the trunks in the several trunk groups affording access to the switching center of destination are busy. When connection has been established to the reorder trunk, the reset circuit RSC (FIG. 3) will take cognizance thereof and will produce a positive potential on its output conductor CRS, thereby causing the release or turning-off of all of the trunk-designating flip-flops of FIGS. 3 and 4 and of the flip-flops E57 and SL of FIG. 6, and placing the system in readiness to service another message, in the manner previously described.

From the foregoing example, it is apparent that access to the various trunk groups at a switching center may be had in accordance with a variety of route advance patterns, such as provided by the route advance flip-flops shown in FIG. 6, under control of the received address codes, and as above described. It is obvious that additional trunk groups may be provided, that the trunk groups may be embraced in a variety of route advance patterns, and that access to the trunk groups may be had under control of other suitable address codes.

*Right-of-way message*

Right-of-way (ROW) messages will, in general, obtain access, via modified or partly inhibited route advance circuitry, to the same trunk groups as described in the foregoing detailed description with reference to nonpriority (NP) messages. However, in the case of ROW messages, certain "class-of-service" circuitry will be operated in order to establish that the incoming message is, in fact, entitled to be forwarded on an ROW basis; and the operation of such "class-of-service" circuitry will also partly inhibit or modify the regular operation of the route advance equipment, and will control the trunk hunting equipment, so that the ROW message may be accorded "bump-off" or trunk pre-emptying privileges.

As a first example, let it be assumed that an ROW message is in process of being served by the instant switching center. Let it be further assumed that the ROW message has associated therewith a multidigit address code having included therein, as the respective numerical equivalents of the significant digits P, D, S, and C, the digital combination 9957, for example. In a manner previously described, the digits P, D, S, and C are registered and translated. The calling class identifier or register CCR (FIG. 6), it is assumed, will have ascertained that the incoming message is entitled to ROW service and will, accordingly, have caused an electrical potential change (or positive potential) to appear on its output conductor CC. The potential change on conductor CC is employed, in the manner previously described, to cause the enablement of gate SLG (FIG. 6). The P digit, in the instant example, being assumed to be a "9," causes the priority index translator PT (FIG. 6) to transmit an electrical potential change representing a corresponding "9" decimal code output, via conductor C9, enabled gate SLG (FIG. 6) and conductor OC9, to the "SET" conductor S of right-of-way flip-flop RW (FIG. 6), causing flip-flop RW to operate and produce an electrical potential change (or positive potential) on its "OUT" conductor ROW. The electrical potential change on conductor ROW is applied to the parallel-connected control conductors of transmission inhibiting gates I–57, I–35 and I–41 (FIG. 6), thereby disabling said gates and inhibiting the normal operation of the route advance circuitry. The output potential on conductor ROW is also applied to the parallel-connected control conductors of the pairs of transmission enabling gates (e.g., pair BU07 and PE07) of FIG. 5, thereby enabling said gates and, in part, preparing operation paths for the "bump-off" circuitry.

The D, S, and C digits, in the instant example, being respectively assumed to be "9," "5" and "7," are the same as earlier described with reference to a nonpriority message wherein the digital combination was 2957. Therefore, the outputs of the route code translator RT (FIG. 6) will be the same, and will, in the same manner as previously stated, cause the operation of flip-flop E57 (FIG. 6).

The operation of flip-flop E57, in the instant example, and as before, indicates that the message is to proceed in an easterly direction with switching center 57 as the switching center destination. Flip-flop E57, in its operated condition, causes an electrical potential change (or positive potential) to appear on its "OUT" conductor O, which potential is applied to the "SET" conductor S of flip-flop ML57 (FIG. 6) and to the parallel-connected control conductors of transmission enabling gates G35, G41 and RO (FIG. 6), thereby causing flip-flop ML57 to operate, and also causing the said gates to be enabled. The operation of flip-flop ML57, in the instant example, indicates that trunk group 57 is the first choice in which to seek an idle trunk to switching center 57, or to preempt the services of the last trunk of the group if it is busy with other than an ROW message.

*Route advance—Modified for ROW*

The operation of flip-flop ML57 (FIG. 6), as before, causes an electrical potential change (or positive potential) to appear on its "OUT" conductor C57, which output potential is transmitted, via diode D57 (FIG. 6) and conductor TG57, to one of the input conductors of the "OR" gate TGG (FIG. 5), and to the parallel-connected control conductors of all of the transmission enabling gates TG–03 through TG–07 (FIG. 5), thereby enabling said "OR" gate and said transmission enabling gates. The enablement of "OR" gate TGG causes it to transmit an electrical potential change (or positive potential), via conductor GC, to the control conductor of the slow-acting transmission enabling gate SCG (FIG. 5). The electrical potential change on conductor GC, if of sufficient duration, will permit the 100 kilocycle oscillator CO (FIG. 5) to transmit a pulse, via conductor 00, gate SCG and conductor SCC, to the "START" conductor S of the trunk scanning ring counter TSRC (FIG. 5), thereby causing the ring counter TSRC to start its trunk scanning cycle to seek an idle trunk in trunk group 57, as previously explained. At the same time, the electrical potential change on conductor C57 is also applied to the lower input conductor of all trunks busy "AND" gate ATB–57 (FIG. 6).

Now let it be assumed, for example, that in trunk group 57, trunks L03, L04, L05, and L06 are all busy and that trunk L07 is busy with an ROW message. Under this condition, the sleeve conductors S03, S04, S05, S06, and S07 will be at ground (or positive) potential. These sleeve potentials are applied, via the previously-described path, to the control conductors of gates BTG–03, BTG–04, BTG–05, BTG–06, and BTG–07, respectively (FIG. 5) thereby disabling all of said gates. The said potentials on the said sleeve conductors are also applied, via the previously-described path, to the correspondingly numbered input conductors of "AND" gate TGB–57 (FIG. 6). With the concurrent application of ground (or positive) potentials to all of the input conductors of "AND" gate TGB–57, an electrical potential change (or positive potential) appears on output conductor TGC57, thereby indicating, as before, that all of the trunks in trunk group 57 are busy. Under this condition, the electrical potential change (or positive potential) on conductor TGC57 is applied to the upper input conductor of all trunks busy "AND" gate ATB–57 (FIG. 6). The lower input conductor of "AND" gate ATB–57, at this time, also has a positive potential applied thereto, as previously described. The concurrent application of positive potentials to both of the input conductors of "AND" gate ATB–57 (FIG. 6) causes an electrical potential (or positive potential) to appear on its output conductor RA1, as before. At this time, since this is an ROW message, gate I–57 (FIG. 6), it will be remembered, is in a disabled condition. Therefore, the electrical potential change on conductor RA1 is prevented from being applied, via gate G35 (FIG. 6), to the "SET" conductor S of flip-flop ML35 (FIG. 6); and, thus, the normal operation of the route advance circuitry is inhiibted. Having in mind the assumption that the last trunk (i.e., L07, FIG. 3) of trunk group 57 is, at this time, serving an ROW message, it must be further assumed that the memory flip-flop M07 (FIG. 5), in a manner to be later described, has been operated to its "SET" or turned-on condition; that the output potential of flip-flop M07 has caused transmission inhibiting gate PR07 (FIG. 5) to change to its disabled state; and that the output potential of flip-flop M07 has caused transmission enabling gate ALT07 (FIG. 5) to change to its enabled state.

Route advance—Alternative paths

Assuming that flip-flop ML57 (FIG. 6) has been operated for an interval of sufficient duration, the output potential therefrom, applied over a previously-described path, causes the enablement of slow-acting gate SCG (FIG. 5) which, in turn, causes the trunk scanning ring counter TSRC (FIG. 5) to start its scanning cycle, in the manner previously described. As the ring counter TSRC successively advances through stages 1 to 4, inclusive, the paths through gates BTG-03 to BTG-06, inclusive, are blocked because of the disablement of said gates. However, when the ring counter TSRC has advanced to its No. 5 stage, an electrical potential change (or positive potential) will be transmitted from stage No. 5, via an alternate route advance control path comprising conductor SC5, gate TG-07, conductor RB-07, gate ALT07 (FIG. 5), and conductor 35RA, to the "SET" conductor S of flip-flop ML35 (FIG. 6), causing flip-flop ML35 to operate and produce an electrical potential change (or positive potential) on its "OUT" conductor C35. The operation of flip-flop ML35, in the instant example, indicates that trunk group 35 is the second choice in which to seek an idle trunk, or to pre-empt the services of the last trunk of the group if it is busy with other than an ROW message, whereby indirect access may be had to switching center 57. The electrical potential change (or positive potential) on conductor C35 is transmitted, via diode D35 (FIG. 6) and conductor TG35, to the correspondingly numbered input conductor of "OR" gate TGG (FIG. 5), and to the parallel-connected control conductors of all of the transmission enabling gates TG-15 through TG-19 (FIG. 5), thereby again enabling said "OR" gate, and enabling said transmission enabling gates. The enablement of "OR" gate TGG again initiates the conditional operation of slow-acting gate SCG (FIG. 5) which, in turn, again initiates the conditional start of the ring counter TSRC (FIG. 5), in the manner previously described. At the same time, the electrical potential change (or positive potential) on conductor C35 is applied to the reset conductor R of flip-flop ML57 (FIG. 6), causing flip-flop ML57 to be reset or turned-off. The potential change on conductor C35 is also applied to the lower input conductor of all trunks busy "AND" gate ATB-35 (FIG. 6).

Now let it be assumed, for example, that in trunk group 35 (as in trunk group 57) all five trunks are busy, and that the last trunk is busy with an ROW message. Under this condition, all of the sleeve conductors of trunk group 35 (FIG. 3) will be at ground (or positive) potential, which potentials are applied, via a path similar to that previously described with reference to trunk group 57, to the control conductors of gates BTG-15, BTG-16, BTG-17, BTG-18, and BTG-19, respectively (FIG. 5), thereby disabling all of said gates. The said potentials on the sleeve conductors S15 to S19, inclusive, of trunk group 35 are also applied, via a previously-described path, respectively, to the correspondingly numbered input conductors of "AND" gate TGB-35 (FIG. 6). With the concurrent application of ground (or positive) potentials to all of the input conductors of "AND" gate TGB-35, an electrical potential change (or positive potential) appears on output conductor TGC-35, thereby indicating, as before, that all of the trunks in trunk group 35 are busy. Under this condition, the electrical potential change on conductor TGC-35 is applied to the upper input conductor of all trunks busy "AND" gate ATB-35 (FIG. 6). The lower input conductor of "AND" gate ATB-35, it will be remembered, also has a positive potential applied thereto, as previously described. The concurrent application of positive potentials to both of the input conductors of "AND" gate ATB-35 (FIG. 6) causes an electrical potential change (or positive potential) to appear on its output conductor RA3, as before. At this time, since this is an ROW message, gate I-35 (FIG. 6), it will be remembered, is in a disabled condition. Therefore, the potential change on conductor RA3 is prevented from being applied, via gate G41 (FIG. 6), to the "SET" conductor S of flip-flop ML41 (FIG. 6), thereby again inhibiting the normal operation of the route advance circuitry. Bearing in mind the assumption that the last trunk (i.e., L19, FIG. 3) of trunk group 35 (FIG. 3) is, at this time, serving an ROW message, it must be further assumed that the memory flip-flop M19 (FIG. 5) has operated to its "SET" condition, that the output potential of flip-flop M19 has caused transmission inhibiting gate PR19 (FIG. 5) to change to its disabled state, and that the output potential of flip-flop M19 has caused transmission enabling gate ALT19 (FIG. 5) to change to its enabled state.

Assuming that the flip-flop ML35 (FIG. 6) has been operated for an interval of sufficient duration, the output potential therefrom, applied over a previously-described path, again causes the enablement of slow-acting gate SCG (FIG. 5) which, in turn, again causes the trunk scanning ring counter TSRC (FIG. 5) to start its scanning cycle. As the ring counter TSRC again successively advances through stages 1 to 4, inclusive, the paths through gates BTG-15 to BTG-18, inclusive, are blocked because of the disablement of said gates. However, when the ring counter TSRC has again advanced to its No. 5 stage, an electrical potential change (or positive potential) will be transmitted from stage No. 5, via an alternate route advance control path comprising conductor SC5, gate TG-19, conductor RB-19, gate ALT19 (FIG. 5), and conductor 41RA, to the "SET" conductor S of flip-flop ML 41 (FIG. 6), causing flip-flop ML41 to operate and produce an electrical potential change (or positive potential) on its "OUT" conductor C41. The operation of flip-flop ML41, in the instant example, indicates that trunk group 41 is the third choice in which to seek an idle trunk, or to pre-empt the services of the last trunk of the group if it is busy with other than an ROW message, whereby indirect access may be had to switching center 57. The electrical potential change (or positive potential) on conductor C41 is transmitted, via diode D41 (FIG. 6) and conductor TG41, to the correspondingly numbered input conductor of "OR" gate TGG (FIG. 5), and to the parallel-connected control conductors of all of the transmission enabling gates TG-20 through TG-24 (FIG. 5), thereby again enabling said "OR" gate, and enabling said transmission enabling gates. The enablement of "OR" gate TGG again initiates the conditional operation of slow-acting gate SCG (FIG. 5) which, in turn, again initiates the conditional start of the ring counter TSRC (FIG. 5), in the manner previously described. At the same time, the electrical potential change (or positive potential) on conductor C41 is applied to the reset conductor R of flip-flop ML35 (FIG. 6), causing flip-flop ML35 to be reset or turned-off. The potential change on conductor C41 is also applied to the lower input conductor of all trunks busy "AND" gate ATB-41 (FIG. 6).

"Bump-off"

Now let it be assumed, for example, that in trunk group 41 all of the trunks are busy, and that the last trunk (i.e. L24, FIG. 3) in the group is busy with a non-right-of-way message. Under this condition, all of the sleeve conductors of trunk group 41 will be at ground (or positive) potential, which potentials are applied, via a path similar to that previously described with reference to trunk group 57, to the control conductors of gates BTG-20, BTG-21, BTG-22, BTG-23 and BTG-24, respectively (FIG. 5), thereby disabling all of the gates. The potentials on the sleeve conductors S20 to S24, inclusive, of trunk group 41 are also applied, via a previously-described path, respectively, to the correspondingly numbered input conductors of "AND" gate TGB-41 (FIG. 6). The concurrent application of ground (or positive) potentials to all of the inputs of "AND" gate TGB-41 causes an electrical potential change (or positive potential) to appear on its output conductor TGC41, thereby indicating, as before, that all of the trunks in trunk group 41 are busy. Under this condition, the electrical potential change (or positive potential) on conductor TGC41 is applied to the upper input conductor of all trunks busy "AND" gate ATB-41 (FIG. 6). The lower input conductor of "AND" gate ATB-41, at this time, it will be remembered, also has a positive potential applied thereto, as previously described. The concurrent application of positive potentials to both of the input conductors of "AND" gate ATB-41 (FIG. 6) causes an electrical potential change (or positive potential) to appear on its output conductor RA5, as previously described. At this time, since this is an ROW message, gate I-41 (FIG. 6), it will be remembered, is in a disabled condition. Therefore, the electrical potential change on conductor RA5 is prevented from being applied, via gate RO (FIG. 6), to the "SET" conductor S of flip-flop MLRO (FIG. 6), thereby again inhibiting the normal operation of the route advance circuitry. Now, having in mind the assumption that the last trunk (i.e., L24, FIG. 3) of trunk group 41 is, at this time, serving a non-ROW message, the memory flip-flop M24 (FIG. 5) is in its normal or unoperated condition; the transmission inhibiting gate PR24 (FIG. 5) is in its normal or enabled condition, and the transmission enabling gate ALT24 (FIG. 5) is in its normal or disabled condition. Also, it will be remembered, the transmission enabling gates BU24 and PE24 (FIG. 5) are in their enabled conditions, as previously described.

*Route advance—alternative paths*

Assuming that the flip-flop ML41 (FIG. 6) has been operated for an inteval of sufficient duration, the output potential therefrom, applied over a previously-described path, again causes the enablement of slow-acting gate SCG (FIG. 5) which, in turn, again causes the trunk scanning ring counter TSRC (FIG. 5) to start its scanning cycle, in the manner previously described. As the ring counter TSRC again successively advances through stages 1 to 4, inclusive, the paths through gates BTG-20 to BTG-23, inclusive, are blocked because of the disablement of said gates. However, when the ring counter TSRC has again advanced to its No. 5 stage, an electrical potential change (or positive potential) will be transmitted from stage No. 5, via a "bump-off" enabling path comprising conductor SC5, gate TG-24, conductor RB-24, gate PR24, gate BU24, conductor I24, regenerative amplifier RA24, and conductor O-24, to the control conductor of "bump-off" control enabling gate BO24 (FIG. 5), thereby enabling gate BO24.

*"Bump-off" signal*

A source of "bump-off" or disconnect signals is represented by the rectangle SBUS (FIG. 5), which signal source may be any suitable device known in the art for generating a suitable signal recognizable by the associated line or trunk circuitry as a directive to disconnect. A signal is now transmitted from SBUS (FIG. 5), via conductor BUS, gate BO24 (FIG. 5), conductor RB-41, a suitable cross-connecting path, and ring conductor R24, to the terminating circuit (CCT.24, FIG. 3) of trunk circuit L24 which trunk, it will be remembered, is assumed to be busy with a non-ROW message.

*Release of trunk*

When the trunk circuit (i.e., L24, FIG. 3) shall have started to release, the ground (or positive) potential on its sleeve conductor S24 is removed, and, in its stead, a transistory negative-going potential is applied to sleeve conductors S24, which negative-going potential is extended, via a suitable cross-connecting path, sleeve conductor S41-5 in cable S41, and capacitor C24 (FIG. 5), to the input of amplifier A24 (FIG. 5). The output potential of amplifier A24 is applied to the reset conductor R of memory flip-flop M24 (FIG. 5), thereby providing a reset potential for flip-flop M24. However, since it is assumed that trunk L24 has been busy with a non-ROW message, flip-flop M24, at this time, is in its normal or nonoperated condition and, hence, the negative-going resetting potential performs no useful function at this time. When the trunk circuit L24 and the switching connection therefor shall have fully released, the negative-going potential on sleeve conductor S24 is supplanted by a steady negative potential, thereby indicating that trunk L24 has become idle. The steady negative potential on sleeve conductor S24 is also applied, via the above-described path, to the control conductor of transmission inhibiting gate BTG-24 (FIG. 5), thereby enabling gate BTG-24.

*Reseizure of trunk*

The ring counter TSRC (FIG. 5) continues its operation and starts to repeat its scanning cycle. As the ring counter TSRC again successively advances through stages 1 to 4, inclusive, the paths through gates BTG-20 to BTG-23, inclusive, are again blocked because of the continued disablement of said gates. However, at this time, when the ring counter TSRC has again advanced to its No. 5 stage, an electrical potential change (or positive potential) will be transmitted from stage No. 5, via conductor SC5, gate TG-24 (FIG. 5), conductor 41-4, gate BTG-24 (FIG. 5), to the trunk-designating conductor TD24. The electrical potential change (or positive potential) on conductor TD24 is applied to the correspondingly-numbered input conductor of "OR" gate OR-41 (FIG. 5), thereby enabling "OR" gate OR-41. The enablement of gate OR-41 causes it to transmit an electrical potential change (or positive potential), via conductor RS, to the right-hand input conductor of "OR" gate SRG (FIG. 5), thereby enabling gate SRG, and thereby causing the ring counter TSRC (FIG. 5) to be reset to its No. 0 stage, in the manner previously described. At the same time, the electrical potential change (or positive potential) on conductor TD24, in cable TDG41, is transmitted to the trunk-designating cross-connecting terminal TDT24 (FIG. 4). The electrical potential change (or positive potential) applied to terminal TDT24 is transmitted, via cross-connection TVX24, diode VD24, conductor V24, cross-connecting terminal TV4, and conductor V4, to the "SET" conductor S of the vertical flip-flop TV4 (FIG. 4), thereby causing flip-flop TV4 to operate. The electrical potential change applied to terminal TDT24 (FIG. 4) is also transmitted, via cross-connection TFX24, diode FD24, conductor F24, cross-connecting terminal FR2 (FIG. 4), and conductor T02, to the "SET" conductor S of the frame flip-flop T2 (FIG. 3), thereby causing flip-flop T2 to operate. The concurrent operation of flip-flops TV4 and T2, and the concomitant operation of relays V4 (FIG. 4) and FR2 (FIG. 3), in a manner similar to that previously described, comprises the circuit operation, in a switching system, whereby the "bumped-off" or "pre-empted" trunk L24 is designated to serve the instant ROW message.

The electrical potential change (or positive potential) on the output conductor CRC of amplifier SRA (FIG. 5) is also applied to the parallel-connected common reset conductors CR of all of the route advance flip-flops of FIG. 6 (e.g., ML41), thereby causing all of the said flip-flops that are turned-on or set at this time to be turned-off or reset.

Now, at this time, let it be assumed that a suitable idle path has been found available in the switching network for interconnecting the incoming and outgoing lines or trunks; and, that as a result of such availability, the switching network check circuit SNC (FIG. 6) is operated, thereby causing an electrical potential change (or positive potential) to appear on its output conductor CCK, as previously described. The electrical potential change on conductor CCK is applied to the parallel-connected input conductors of transmission enabling gates PE07, PE19 and PE24 (FIG. 5); and since this is an ROW message, the said gates, it will be remembered, are in their enabled states because of the positive potential on conductor ROW (i.e., the output potential from flip-flop RW, FIG. 6). The electrical potential change (or positive potential) on conductor CCK is transmitted through gate PE24 to the "SET" conductor S of memory flip-flop M24 (FIG. 5), causing flip-flop M24 to become operated or turned-on, thereby to "remember" that trunk L24 is now engaged in serving an ROW message, and, therefore, may not be pre-empted or "bumped-off." The electrical potential change on conductor CCK is also applied to the input conductor DR of delay circuit RD (FIG. 6), and, after a brief delay interval, sufficient to permit flip-flop M24 to be operated, is transmitted therethrough to reset conductor CR of the right-of-way flip-flop RW (FIG. 6), as earlier described; and since this is a ROW message, flip-flop RW will now be caused to become reset or restored to its normal state, thereby removing the positive potential from its output conductor ROW. Now, at this time, shortly subsequent to the operation of the switching network check circuit SNC (FIG. 6), let it also be assumed that the designated "bump-off" trunking path has been established. Under this condition, the reset circuit RSC (FIG. 3) takes cognizance thereof and, in the manner previously described, effects the release of all of the trunk-designated flip-flops of FIGS. 3 and 4 and of the flip-flops E57 and SL of FIG. 6, and places the system in readiness to service another message.

ROW—"Reorder"

Now, as an alternative condition incident to seeking an idle trunk to switching center 57 to serve an ROW message, let it be further assumed, for example as, above described, not only that the first four trunks in trunk groups 57 and 35 are busy and the last trunks in trunk groups 57 and 35 are busy with ROW messages, but also that the first four trunks of trunk group 41 are busy and that the last trunk in trunk group 41 is busy with an ROW message. Under this condition, the same sleeve supervisory conditions will obtain as previously described with reference to trunk group 35, and the operation of trunk scanning ring counter TSRC (FIG. 5) will again be initiated. When the ring counter TSRC has again advanced to its No. 5 stage, an electrical potential change (or positive potential) will be transmitted from stage No. 5, via an alternate route advance control path comprising conductors SC5, gate TG-24, conductor RB-24, gate ALT24 (FIG. 5), and conductor ROA, to the "SET" conductor S of flip-flop MLRO (FIG. 6), causing flip-flop MLRO to operate and produce an electrical potential change (or positive potential) on its "OUT" conductor CRO. The operation of flip-flop MLRO, in the instant example, indicates that all of the first four trunks in trunk groups 57, 35 and 41 are busy, and that the last trunks in said trunk groups are respectively busy with ROW messages. The operation of flip-flop MLRO effectuates a series of circuit operations, which operations are exactly as previously described with reference to "REORDER," and culminate in the seizure of a reorder trunk, and the previously-described circuit operations concomitant thereto.

It is to be understood that the calls traced hereinabove are entirely by way of illustration and are in nowise to be construed as limiting the operation of the system to the calls so traced.

It is also to be understood that the above-described arrangements are merely illustrative of the application of the principles of the invention, and that numerous other arrangements may be devised by those skilled in the art without departing from the spirit and scope of the invention.

What is claimed is:

1. In a switching system wherein switching apparatus is controllable to effect a preferred connection to a line terminating in said apparatus; means operable to validate that a preferred connection to said line is to be effected; means individual to said line and settable to indicate whether said line is busy or idle and whether said line is busy in a preferred connection or is not busy in a preferred connection; and, means controlled by said validating means and by said indicating means individual to said line to apply a disconnect signal to said line if said line is not busy in a preferred connection, to designate said line for connection when said line is idle, and to enable said indicating means to be set to indicate whenever said line is busy in a preferred connection.

2. In a switching system wherein switching apparatus is controllable to effect a right-of-way connection to a line terminating in said apparatus; means operable to validate that a right-of-way connection to said line is to be effected; means individual to said line and settable under the control of said line to indicate whether said line is busy or idle; means individual to said line and settable to signify whether said line is busy in a right-of-way connection or is not busy in a right-of-way connection; means controlled by said operated validating means and by said signifying means individual to said line to apply a disconnect signal to said line if said line is not busy in a right-of-way connection; and, means controlled by said operated validating means and by said indicating means to designate said line for connection when said line is idle and to enable said signifying means to be set to signify whenever said line is busy in a right-of-way connection.

3. In a switching system wherein switching apparatus is controllable to effect a right-of-way connection to a line terminating in said apparatus; means operable to validate that a right-of-way connection to said line is to be effected; means individual to said line and settable under the control of said line to indicate whether said line is busy or idle; means individual to said line and settable to signify whether said line is busy in a right-of-way connection or is not busy in a right-of-way connection; means controlled by said operated validating means and by said signifying means individual to said line to apply a disconnect signal to said line if said line is not busy in a right-of-way connection; means controlled by said indicating means to designate said line for connection when said line is idle; and, means controlled by said operated validating means to enable said signifying means to be set to signify whenever said line is busy in a right-of-way connection.

4. The invention defined in claim 3 wherein said indicating means comprises a first two-state device settable into one state to indicate a busy line and settable into the other state to indicate an idle line; wherein said signifying means comprises a second two-state device settable into one state to signify that said line is busy in a right-of-way connection and settable into the other state to signify that said line is not busy in a right-of-way connection; wherein said applying means comprises circuitry effective to apply said disconnect signal only when said validating means is operated and said second device is set in its other state; wherein said designating means comprises circuitry controlled only when said first device is set in its other state; and, wherein said enabling means comprises a settable third two-state device set into one state when said validating means is operated and set into the other state at other times.

5. In a switching system wherein switching apparatus is controllable to effect a right-of-way connection to a line terminating in said apparatus; means operable to validate that a right-of-way connection to said line is to be effected; a first transmission gate individual to the line and controlled by the line to be nonconductive to indicate that the line is busy, and to be conductive to indicate that the line is idle; a first flip-flop controlled to be in a set condition whenever the line is busy in a right-of-way connection and to be in a reset condition whenever the line is not busy in a right-of-way connection; applying circuitry controlled by said operated validating means and by said flip-flop to apply a disconnect signal to the line, said applying means including second and third transmission gates in series, said second gate controlled by said flip-flop to be nonconductive when said flip-flop is set and to be conductive when said flip-flop is reset, said third gate controlled by said validating means to be conductive when said validating means is operated and to be nonconductive at other times; circuit means controlled by said first transmission gate to designate the line for connection when the line is idle comprising circuitry controlled only when said first transmission gate is conductive; and, enabling means controlled by said operated validating means to enable said first flip-flop to be set to signify whenever the line is busy in a right-of-way connection, said enabling means comprising a fourth transmission gate also controlled by said validating means to be conductive when said validating means is operated and to be nonconductive at other times.

6. The invention defined in claim 5 wherein said first gate is a transmission disabling gate having a control terminal connected to said line; wherein said second gate is a transmission disabling gate having a control terminal connected to said first flip-flop; wherein said third gate is a transmission enabling gate having a control terminal connected to said validating means; and, wherein said fourth gate is a transmission enabling gate having a control terminal connected to said validating means.

7. The invention defined in claim 6 wherein said first flip-flop has a set terminal, a reset terminal, and an output terminal; wherein each said gate also has an output terminal and an input terminal: wherein said validating means comprises a second flip-flop having an output terminal and operable into a set state and releasable into a reset state; wherein said second flip-flop output terminal is connected to the control terminals of said third and fourth gates; wherein said designating circuitry is connected in circuit with the input and output terminals of said first gate; wherein the input terminals of said first and second gates are connected together; wherein the output terminal of said second gate is connected to the input terminal of said third gate; wherein said applying circuitry is connected in circuit with the input terminal of said second gate and the output terminal of said third gate; and, wherein said first flip-flop has its reset terminal connected in circuit with said line, its set terminal connected to the output terminal of said fourth gate, and its output terminal connected to the control terminal of said second gate.

8. The invention defined in claim 7 wherein said designating circuitry includes a source of operating signal connected to the input terminals of said first and second gates and includes operable line designating means connected to the output terminal of said first gate; whereby whenever said first gate is conductive said operating signal is effective through said first gate to operate said line designating means; and, wherein said applying circuitry includes a source of disconnect signal and includes a fifth transmission enabling gate having an output terminal connected to said line and having an input terminal connected to said disconnect signal source and having a control terminal connected in circuit with the output terminal of said third gate; whereby whenever said second and third gates are conductive said operating signal is effective through said second and third gates in series to cause said fifth gate to be conductive, whereupon said disconnect signal source is effective to apply said disconnect signal to said line through said fifth gate.

9. In a switching system wherein switching apparatus is controllable to interconnect an incoming line with service facility lines designated for interconnection in accordance with the receipt over said incoming line of route codes specifying interconnection with desired service facilities represented by said facility lines; means operable for registering a route code; means operable for denoting that an incoming line is entitled to associate with said registered code a right-of-way signal signifying a request for a right-of-way connection; means operable under the control of said operated denoting means for detecting a right-of-way signal associated with said registered code; means for indicating whether a facility line is busy or idle and whether said facility line is busy in a right-of-way connection or is not busy in a right-of-way connection; means controlled by said operated registering means and by said indicating means for designating for interconnection an idle facility line; and, means controlled by said operated registering means and by said operated detecting means and by said indicating means for applying a disconnect signal to a facility line not busy in a right-of-way connection.

10. In a switching system wherein switching apparatus is controllable to interconnect an incoming line with service facility lines designated for interconnection in accordance with the receipt over said incoming line of route codes specifying interconnection with desired service facilities represented by said facility lines; means operable for registering a route code; means operable for denoting that an incoming line is entitled to associate with said registered code a right-of-way signal signifying a request for a right-of-way connection; means operable under the control of said operated denoting means for detecting a right-of-way signal associated with said registered code; means for indicating whether any facility line is busy or idle and for indicating whether certain ones thereof are busy in right-of-way connections or are not busy in right-of-way connections; means controlled by said operated registering means and by said indicating means for designating for interconnection an idle facility line; and, means controlled by said operated registering means and by said operating detecting means and by said indicating means for applying a disconnect signal to one of said certain facility lines not busy in a right-of-way connection.

11. In a switching system wherein switching apparatus is controllable to interconnect an incoming line with service facility lines designated for interconnection in accordance with the receipt over said incoming line of route codes specifying interconnection with desired service facilities represented by said facility lines; means operable for registering a route code; means operable for denoting that an incoming line is entitled to associate with said registered code a right-of-way signal signifying a request for a right-of-way connection; means operable under the control of said operated denoting means for detecting a right-of-way signal associated with said registered code; means for ascertaining whether any facility line is busy or idle; means for discriminating whether certain facility lines are busy in right-of-way connections or are not busy in right-of-way connections; means controlled by said operated registering means and by said ascertaining means for designating for interconnection an idle facility line; and, means controlled by said operated registering means and by said operated detecting means and by said discriminating means for applying a disconnect signal to one of said certain facility lines which is not busy in a right-of-way connection.

12. In a switching system wherein switching apparatus is controllable to interconnect an incoming line with service facility lines designated for interconnection in accordance with the receipt over said incoming line of route codes specifying interconnection with desired service facilities represented by said facility lines; means operable for registering a specific route code specifying interconnection with service facilities represented by a specific group of facility lines comprising a plurality of regular facility lines and a particular facility line; means operable for denoting that an incoming line is entitled to associate with said registered code a right-of-way signal signifying a request for a right-of-way connection; means operable under the control of said operated denoting means for detecting a right-of-way signal associated with said registered code; means for ascertaining the busy-idle condition of any facility line of said specific group; means for discriminating whether said particular facility line is busy in a right-of-way connection or is not busy in a right-of-way connection; means controlled by said operated registering means according to said registered specific code and by said ascertaining means incident to the existence of at least one idle facility line in said specific group for designating for interconnection a said idle facility line; and, means controlled by said operated registering means according to said registered specific code, by said operated detecting means, by said ascertaining means incident to an all-regular-in-line-busy condition of said specific group, and by said discriminating means incident to said particular facility line not being busy in a right-of-way connection for applying a disconnect signal to said particular facility line.

13. The invention defined in claim 12 wherein said ascertaining means includes test circuitry individual to each facility line and controlled thereby according to the busy or idle condition thereof; and, wherein said discriminating means includes use status circuitry individual to said particular facility line and controlled by said operated detecting means incident to the designation for interconnection of said particular facility line to signify that said designation relates to a right-of-way connection.

14. The invention defined in claim 13 wherein said status circuitry comprises a dual-condition memory device settable into one condition under the control of said operated detecting means and incident to the designation for interconnection of said particular facility line to signify that said designation relates to a right-of-way interconnection.

15. The invention defined in claim 14 wherein said memory device comprises a bistable electronic device settable into one state to signify that said particular facility line is busy in a right-of-way connection and resettable into the other state to signify that said particular facility line is not busy in a right-of-way connection; wherein said operated detecting means causes the setting of said device incident to said particular facility line being designated for a right-of-way interconnection; and, wherein said particular facility line in changing its condition from busy to idle causes the resetting of said device.

16. The invention defined in claim 15 wherein said test circuitry comprises an electronic test gate for each facility line and controlled by the corresponding facility line to enable transmission through said test gate whenever said corresponding facility line is idle and to disable transmission through said test gate whenever said corresponding facility line is busy; wherein said designating means includes a source of operating signal and registering devices selectively operable by said operating signal under the control of enabled test gates to thereby designate for interconnection an idle facility line corresponding to an enabled test gate; wherein said status circuitry further comprises an electronic line gate controlled by said electronic memory device to disable transmission through said line gate whenever said device is in its set state and to enable transmission through said line gate whenever said device is in its reset state, and an electronic disconnect gate controlled by said detecting means to disable transmission through said disconnect gate whenever said detecting means is released and to enable transmission through said disconnect gate whenever said detecting means is operated; and, wherein said applying means includes a source of disconnect signal and includes an electronic applying gate controlled by said operating signal through enabled line and disconnect gates for applying said disconnect signal to said particular facility line.

17. The invention is claim 16 wherein said memory device is an electronic flip-flop having a set terminal and a reset terminal and an output terminal; wherein said particular line test-gate and said particular line line-gate are transmission inhibiting gates having input and output terminals and having control terminals respectively connected to said particular facility line and to said flip-flop output terminal; wherein said disconnect and applying gates are transmission enabling gates having input and output terminals and having control terminals respectively connected to said detecting means and connected in circuit with said disconnect gate output terminal; wherein said source of operating signal has associated therewith an output conductor for carrying said operating signal and connected to the input terminals of said test and line gates; wherein the output terminal of said line gate is connected to the input terminal of said disconnect gate; wherein the output terminal of said applying gate is connected to said particular facility line; wherein said source of disconnect signal has associated therewith an output conductor for carrying said disconnect signal and connected to the input terminal of said applying gate; and, wherein said status circuitry further comprises a transmission enabling set gate controlled by said operated detecting means incident to the designation for interconnection of said particular facility line for setting said flip-flop into its said one state.

18. In a switching system wherein switching apparatus is controllable to interconnect an incoming line with an idle one of a group of outgoing lines where said idle line is designated for interconnection is accordance with the receipt over said incoming line of a route code specifying a route served by said outgoing line group; means operable for registering a route code; means operable for denoting that an incoming line is entitled to associate with said registered code a right-of-way signal signifying a request for a right-of-way connection; means operable under the control of said operated denoting means for detecting a right-of-way signal associated with said registered code; means individual to each outgoing line for indicating whether said line is busy or idle; means individual to a particular outgoing line for signifying whether said particular line is busy in a right-of-way connection or is not busy in a right-of-way connection; means operated under the control of said operated registering means for testing said indicating means one at a time in a prescribed order with said particular line indicating means being last in said order; means controlled by said testing means incident to testing the first indicating means which in said order indicates an idle outgoing line for designating for interconnection the said corresponding idle outgoing line and for stopping the said testing; and, means controlled jointly by said testing means incident to testing said particular line indicating means, by said signifying means whenever said particular line is not busy in a right-of-way connection, and by said operated detecting means for applying a disconnect signal to said particular line; said testing means being effective incident to the application of a disconnect signal to a non-right-of-way-busy particular line for retesting said indicating means in the same said order.

19. The invention defined in claim 18 wherein said indicating means includes test circuitry individual to each outgoing line and controlled thereby to establish an electrical condition according to the busy or idle condition of the associated outgoing line; wherein said signifying means includes status circuitry individual to said particular line and controlled by said operated detecting means incident to the designation for interconnection of said particular line to signify that said designation relates to a right-of-way connection; wherein said testing means comprises a start-stop recycling scanner operable for scanning the electrical conditions of said test circuitry; wherein said stopping means comprises means for stopping the operation of said scanner incident to the designation of any idle outgoing line for interconnection;

and, wherein said testing means comprises circuitry for allowing said scanner to recycle and initiate another scanning cycle after scanning the electrical condition of said particular line test circuitry unless stopped by said stopping means.

20. The invention defined in claim 19 wherein said status circuitry comprises a dual-condition memory device settable into one condition under the control of said operated detecting means and incident to the designation for interconnection of said particular line to signify that said designation relates to a right-of-way interconnection.

21. The invention defined in claim 20 wherein said memory device comprises a bistable electronic device settable into one state to signify that said particular line is busy in a right-of-way connection and resettable into the other state to signify that said particular line is not busy in a right-of-way connection; wherein said operated detecting means causes the setting of said device incident to said particular line being designated for a right-of-way interconnection; and, wherein said particular line in changing its condition from busy to idle causes the resetting of said device.

22. The invention defined in claim 21 wherein said test circuitry comprises an electronic test gate for each outgoing line and controlled by the corresponding outgoing line to enable transmission through said test gate whenever said corresponding outgoing line is idle and to disable transmission through said test gate whenever said corresponding outgoing line is busy; wherein said scanner includes a source of operating signal; wherein said designating means includes registering devices selectively operable by said operating signal under the control of said scanner when scanning enabled test gates to thereby designate for interconnection an idle outgoing line corresponding to an enabled test gate; wherein said status circuitry further comprises an electronic line gate controlled by said electronic memory device to disable transmission through said line gate whenever said device is in its set state and to enable transmission through said line gate whenever said device is in its reset state, and an electronic disconnect gate controlled by said detecting means to disable transmission through said disconnect gate whenever said detecting means is released and to enable transmission through said disconnect gate whenever said detecting means is operated; and, wherein said applying means includes a source of disconnect signal and includes an electronic applying gate controlled by said operating signal through enabled line and disconnect gates when said scanner is scanning said particular line test gate for applying said disconnect signal to said particular line.

23. The invention in claim 22 wherein said memory device is an electronic flip-flop having a set terminal and a reset terminal and an output terminal; wherein said particular line test-gate and said particular line line-gate are transmission inhibiting gates having input and output terminals and having control terminals respectively connected to said particular line and to said flip-flop output terminal; wherein said disconnect and applying gates are transmission enabling gates having input and output terminals and having control terminals respectively connected to said detecting means and connected in circuit with said disconnect gate output terminal; wherein said scanner source of operating signal has associated therewith an output conductor for carrying said operating signal and connected to the input terminals of said test and line gates; wherein the output terminal of said line gate is connected to the input terminal of said disconnect gate; wherein the output terminal of said applying gate is connected to said particular line; wherein said source of disconnect signal has associated therewith an output conductor for carrying said disconnect signal and connected to the input terminal of said applying gate; and, wherein said status circuitry further comprises a transmission enabling set gate controlled by said operated detecting means incident to the designation for interconnection of said particular line for setting said flip-flop into its said one state.

24. In a switching system wherein trunks are designated for service under the control of route codes; means for registering a route code; means for detecting a pre-empt signal associated with said registered code; means for signifying whether a particular busy trunk may be pre-empted for service; and, means responsive to said detecting means and to said signifying means for applying a disconnect signal to said particular busy trunk to pre-empt said particular trunk.

25. In a switching system wherein trunks are designated for service under the control of route codes; means operable to register a route code; a plurality of groups of trunks each of which groups incudes a special trunk, certain groups representing preferred and alternate routes for certain registered codes; means individual to each said special trunk in each trunk group to signify whether or not said special trunk when busy is permitted to be pre-empted for service; means controlled by said operated registering means to hunt for an idle trunk in a particular trunk group representing a preferred route for said registered code; and, circuit means controlled jointly by said hunting means and by said signifying means incident to finding an all-trunks-busy condition in said particular group when said special trunk therein is permitted to be pre-empted to apply a disconnect signal to said special trunk and to cause said hunting means to again hunt for an idle trunk in said same particular group.

26. The invention defined in claim 25 wherein is provided means operable to detect a pre-empt signal associated with said registered code; wherein said hunting means is controlled jointly by said operated registering means and by said operated detecting means; and, wherein said circuit means is controlled jointly by said hunting means and by said operated detecting means and by said signifying means.

27. In a switching system wherein trunks are designated for service under the control of route codes; means operable to register a route code; a plurality of groups of trunks each of which groups includes a special trunk, certain groups representing preferred and less-preferred alternate routes for certain registered codes; means individual to each said special trunk in each trunk group to signify whether or not said special trunk when busy is permitted to be pre-empted for service; means controlled by said operated registering means to hunt for an idle trunk in a particular trunk group representing a preferred route for said registered code; and, circuit means controlled jointly by said hunting means and by said signifying means incident to finding an all-trunks-busy condition in said particular group (a) when said special trunk therein is permitted to be pre-empted to apply a disconnect signal to said special trunk and to cause said hunting means to again hunt for an idle trunk in said same particular group and (b) when said special trunk therein is not permitted to be pre-empted to cause said hunting means to hunt for an idle trunk in another particular trunk group representing a less-preferred route for said registered code.

28. The invention defined in claim 27 wherein is provided means operable to detect a pre-empt signal associated with said registered code; wherein said hunting means is controlled jointly by said operated registering means and by said operated detecting means; and, wherein said circuit means is controlled jointly by said hunting means and by said operated detecting means and by said signifying means.

29. The invention defined in claim 27 wherein is provided means operable to detect a pre-empt signal associated with said registered code; wherein said hunting means is controlled jointly by said operated registering means and by said operated detecting means; and, wherein said circuit means (a) includes first circuit means controlled jointly by said hunting means and by said operated detecting means and by said signifying means incident to finding an all-trunks-busy condition in said particular trunk group when said special trunk therein is permitted to be pre-empted to apply a disconnect signal to said special trunk and to cause said hunting means to again hunt for an idle trunk in said same particular trunk group and (b) includes second circuit means controlled jointly by said hunting means and by said operated detecting means and by said signifying means incident to finding an all-trunks-busy condition in said particular trunk group when said special trunk therein is not permitted to be pre-empted to cause said hunting means to hunt for an idle trunk in another particular trunk group representing a less-preferred route for said registered code.

30. In a switching system wherein trunks are designated for service under the control of route codes; means operable to register a route code; means operable to detect a pre-empt signal associated with said registered code; a plurality of groups of trunks, certain groups representing preferred and alternate routes for certain registered codes; means individual to and controlled by each trunk group to indicate whether or not at least one of the trunks in said group is idle; a route advance test circuit selectively operable under the joint control of said operated registering means and of said operated detecting means to test the said indicating means individual to a particular trunk group representing a preferred route for said registered code; and, a trunk hunting circuit selectively operable under the control of said operated test circuit to hunt for an idle trunk in the particular group tested regardless of whether or not the said indicating means individual thereto indicates that there is at least one idle trunk in said particular group tested.

31. In a switching circuit wherein trunks are designated for service under the control of route codes; means operable to register a route code; means operable to detect a pre-empt signal associated with said registered code; a plurality of groups of trunks each of which groups includes a special trunk, certain groups representing preferred and alternate routes for certain registered codes; means individual to and controlled by each trunk group to indicate whether or not at least one of the trunks in said group is idle; a route advance test circuit selectively operable under the joint control of said operated registering means and of said operated detecting means to test the said indicating means individual to a particular trunk group representing a preferred route for said registered code; a trunk hunting circuit selectively operable under the control of said operated test circuit to hunt for an idle trunk in the particular group tested regardless of whether or not the said indicating means individual thereto indicates that there is at least one idle trunk in said particular group tested; means individual to each said special trunk in each trunk group to signify whether or not said special trunk when busy is permitted to be pre-empted for service; and, circuit means controlled jointly by said operated hunting circuit and by said signifying means incident to finding an all-trunks-busy condition in said particular group tested when said special trunk is permitted to be pre-empted to apply a disconnect signal to said special trunk and to cause said hunting circuit to again hunt for an idle trunk in said same particular group tested.

32. In a switching circuit wherein trunks are designated for service under the control of route codes; means operable to register a route code; means operable to detect a pre-empt signal associated with said registered code; a plurality of groups of trunks each of which groups includes a special trunk, certain groups representing preferred and less-preferred alternate routes for certain registered codes; means individual to and controlled by each trunk group to indicate whether or not at least one of the trunks in said group is idle; a route advance test circuit selectively operable under the joint control of said operated registering means and of said operated detecting means to test the said indicating means individual to a particular trunk group representing a preferred route for said registered code; a trunk hunting circuit selectively operable under the control of said operated test circuit to hunt for an idle trunk in the particular group tested regardless of whether or not the said indicating means individual thereto indicates that there is at least one idle trunk in said particular group tested; means individual to each said special trunk in each trunk group to signify whether or not said special trunk when busy is permitted to be pre-empted for service; and, circuit means controlled jointly by said operated hunting circuit and by said signifying means incident to finding an all-trunks-busy condition in said particular group tested (a) when said special trunk is permitted to be pre-empted to apply a disconnected signal to said special trunk and to cause said hunting circuit to again hunt for an idle trunk in said same particular group tested and (b) when said special trunk is not permitted to be pre-empted to cause another selective operation of said test circuit to test the said indicating means individual to another particular trunk group representing a less-preferred route for said registered code.

33. The invention defined in claim 32 wherein said circuit means includes (a) first circuit means controlled jointly by said operated hunting circuit and by said signifying means incident to finding an all-trunks-busy condition in said particular trunk group tested when said special trunk is permitted to be pre-empted to apply a disconnect signal to said special trunk and to cause said hunting circuit to again hunt for an idle trunk in said same particular group tested and includes (b) second circuit means controlled jointly by said operated hunting circuit and by said signifying means incident to finding an all-trunks-busy condition in said particular group tested when said special trunk is not permitted to be pre-empted to cause another selective operation of said test circuit to test the said indicating means individual to another particular trunk group representing a less preferred route for said registered code.

References Cited by the Examiner
UNITED STATES PATENTS

| | | | |
|---|---|---|---|
| 2,279,295 | 4/42 | Blanton | 178—2 |
| 2,365,996 | 12/44 | Bakker | 179—27 |
| 2,578,071 | 12/51 | Jones et al. | 179—18 |
| 2,805,283 | 9/57 | Stiles | 178—2 |
| 2,807,670 | 9/57 | Brandstetter et al. | 179—18 |
| 2,863,001 | 12/58 | Trousdale | 179—15 |

ROBERT H. ROSE, *Primary Examiner.*

WALTER L. LYNDE, *Examiner.*